United States Patent
Zhong et al.

(10) Patent No.: US 10,951,512 B2
(45) Date of Patent: Mar. 16, 2021

(54) DATA FORWARDING METHOD AND DEVICE

(71) Applicant: Huawei Technologies Co., Ltd., Shenzhen (CN)

(72) Inventors: Qiwen Zhong, Shenzhen (CN); Xiaojun Zhang, Shenzhen (CN); Xiaofei Xu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 73 days.

(21) Appl. No.: 16/201,411

(22) Filed: Nov. 27, 2018

(65) Prior Publication Data

US 2019/0097914 A1  Mar. 28, 2019

Related U.S. Application Data

(63) Continuation of application No. PCT/CN2017/080893, filed on Apr. 18, 2017.

(30) Foreign Application Priority Data

May 27, 2016 (CN) .......................... 201610368270.7

(51) Int. Cl.
*H04W 72/04* (2009.01)
*H04L 12/727* (2013.01)
(Continued)

(52) U.S. Cl.
CPC .......... *H04L 45/121* (2013.01); *H04J 3/1658* (2013.01); *H04L 7/041* (2013.01);
(Continued)

(58) Field of Classification Search
CPC ..... H04L 45/121; H04L 45/125; H04L 7/041; H04L 2007/045; H04J 3/1658; H04J 2203/0085; H04Q 11/005
See application file for complete search history.

(56) References Cited

U.S. PATENT DOCUMENTS 7,391,760 B1 * 6/2008 Caldwell ................ H04L 12/66
                                                    370/352
7,869,468 B1   1/2011 Giannakopoulos et al.
(Continued)

FOREIGN PATENT DOCUMENTS

CN          101039245 A        9/2007
CN          101631064 A        1/2010
(Continued)

OTHER PUBLICATIONS

"Considerations on the mapping of FlexE Client and Subrate Signals into OTN" International Telecommunication Union, COM15-C1195-E, pp. 1-13, XP044136869, International Union of Telecommunication—Geneva, Switzerland (Jun. 2015).

*Primary Examiner* — Hassan Kizou
*Assistant Examiner* — Mahbubul Bar Chowdhury
(74) *Attorney, Agent, or Firm* — Leydig, Voit & Mayer, Ltd.

(57) ABSTRACT

This application discloses a data forwarding method and device. The method includes: obtaining a first data unit sequence stream by using a first logical ingress port, where the first data unit sequence stream includes at least one first data unit; determining, according to a preconfigured mapping relationship between at least one logical ingress port and at least one logical egress port, a first logical egress port corresponding to the first logical ingress port, where the at least one logical ingress port includes the first logical ingress port; adjusting a quantity of idle units in the first data unit sequence stream, so that a rate of an adjusted first data unit sequence stream matches a rate of the first logical egress port; and sending the adjusted first data unit sequence stream by using the first logical egress port.

19 Claims, 11 Drawing Sheets

(51) Int. Cl.
    *H04J 3/16*       (2006.01)
    *H04L 7/04*       (2006.01)
    *H04L 12/729*    (2013.01)

(52) U.S. Cl.
    CPC .... *H04L 45/125* (2013.01); *H04J 2203/0085* (2013.01); *H04L 2007/045* (2013.01)

(56) References Cited

U.S. PATENT DOCUMENTS

| | | |
|---|---|---|
| 9,231,721 B1 | 1/2016 | Varadarajan et al. |
| 2007/0211750 A1 | 9/2007 | Li et al. |
| 2007/0268931 A1 | 11/2007 | Shaikli |
| 2009/0300233 A1* | 12/2009 | Jin .......... H04L 47/10 710/34 |
| 2010/0061725 A1* | 3/2010 | Jiang ........ H04J 3/1658 398/45 |
| 2010/0098415 A1* | 4/2010 | Jiang ........ H04J 3/1658 398/45 |
| 2015/0063364 A1* | 3/2015 | Thakkar ...... H04L 12/66 370/401 |
| 2015/0271303 A1* | 9/2015 | Neginhal ...... H04L 49/70 370/392 |
| 2016/0080842 A1 | 3/2016 | Ma et al. |
| 2017/0126552 A1* | 5/2017 | Pfaff ............ G06F 16/2282 |

FOREIGN PATENT DOCUMENTS

| | | |
|---|---|---|
| CN | 102025445 A | 4/2011 |
| CN | 104185094 A | 12/2014 |
| CN | 105227453 A | 1/2016 |
| EP | 2479912 B1 | 7/2014 |
| WO | 2014187371 A1 | 11/2014 |
| WO | 2016019798 A1 | 2/2016 |

\* cited by examiner

FIG. 9

DATA FORWARDING METHOD AND DEVICE

CROSS-REFERENCE TO RELATED APPLICATIONS

This application is a continuation of International Application No. PCT/CN2017/080893, filed on Apr. 18, 2017, which claims priority to Chinese Patent Application No. 201610368270.7, filed on May 27, 2016. The disclosures of the aforementioned applications are hereby incorporated by reference in their entireties.

TECHNICAL FIELD

Embodiments of this application relate to the communications field, and more specifically, to a data forwarding method and device.

BACKGROUND

In various existing network systems, packet data is usually forwarded by a packet device (or referred to as a forwarding device) by forwarding packet data units one by one. Specifically, the packet device performs table lookup based on information such as a destination address and a label that are included in the packet data unit (or referred to as a packet), to determine a forwarding behavior for the packet data. For example, a packet device in an Ethernet, an Ethernet switch, performs table lookup based on a destination Media Access Control (MAC) address to determine an egress port. For another example, in Multiprotocol Label Switching (MPLS), processing and forwarding behaviors for the packet are determined according to an MPLS packet label. A fiber channel (FC) switch, an infinite bandwidth (InfiniB and) switch, an Internet Protocol (IP) router, and the like also have a similar packet data forwarding mechanism. Sizes and scales of lookup tables in various network systems are different, and therefore, times consumed for table lookup and difficulties in table lookup vary.

Specifically, the Ethernet is used as an example. Simplest Ethernet switching complies with an 802.1d standard, and a source MAC address and a destination MAC address in a packet that meets an integrity requirement after CRC check is performed on the packet need to be identified. On the one hand, the source MAC address is learned to maintain a lookup table that is obtained by means of learning and that is of a correspondence between the destination MAC address and an egress port (that is, a forwarding destination port). On the other hand, according to the lookup table, table lookup is performed, for matching, for destination MAC addresses of packets arriving at all ingress ports, so as to obtain an egress port. Then, packet data units queue in a caching queue at a corresponding egress port, and wait to be sent through the egress port. In addition, more labels are further introduced into an Ethernet 802.1q standard to distinguish different services and streams, and another manner for performing forwarding decision-making and maintaining a lookup table to support more flexible forwarding decision-making is also introduced, but the mechanism remains unchanged. Cases for the fibre channel switch, the Infini-Band Switch, the IP Router, and the like are generally similar to this. In this mechanism, the forwarding decision-making information such as the destination address and the label is identified per packet, the packet data unit is forwarded, and therefore, a forwarding delay of the entire packet data is relatively large.

In addition, as a basic feature of a statistical multiplexing characteristic, a packet arriving at each ingress port has emergent and uncertain characteristics. When a plurality of packets that arrive successively or simultaneously through different ingress ports all need to be sent through a specific egress port and exceed a service capability of the egress port, caching and queuing necessarily need to be performed. However, when there are a relatively small quantity of packets that are in packets arriving through ingress ports and that need to be sent through a specific egress port and the quantity of packets is far lower than a service capability of the egress port, the egress port is idle or transmits idle padding information, and consequently, the service capability of the egress port and a bandwidth of the egress port are wasted. To ensure that service capability utilization and bandwidth utilization of an egress port each reaches a specific percentage, for example, 95%, a most effective measure is to maintain a specific caching and queuing length of served packets at each egress port. Therefore, packet data switching performed by an existing packet device is also generally described as storing and forwarding.

As a quantity of ports of a packet device, a port bandwidth, a packet device capacity, and a system requirement for a forwarding delay increase, table lookup and data cache storage cost a large quantity of hardware resources, and consequently, the packet device has high costs and is in a limited scale. In addition, uncertain data cache storage and table lookup cause an uncertainly high delay. As a result, it is difficult for the packet device to adapt to some delay-sensitive applications.

SUMMARY

This application provides a data forwarding method and device, so as to increase a service throughput capability and decrease a data forwarding delay.

According to a first aspect, this application provides a data forwarding method, including: obtaining a first data unit sequence stream by using a first logical ingress port, where the first data unit sequence stream includes at least one first data unit; determining, according to a preconfigured mapping relationship between at least one logical ingress port and at least one logical egress port, a first logical egress port corresponding to the first logical ingress port, where the at least one logical ingress port includes the first logical ingress port; adjusting a quantity of idle units in the first data unit sequence stream, so that a rate of an adjusted first data unit sequence stream matches a rate of the first logical egress port; and sending the adjusted first data unit sequence stream by using the first logical egress port.

The first logical ingress port may correspond to at least one physical ingress interface or at least one timeslot of at least one physical ingress interface, and the first logical egress port may correspond to at least one physical egress interface or at least one timeslot of at least one physical egress interface.

The first data unit sequence stream may further include at least one idle unit.

The data forwarding method and device in this application may be based on a plurality of network technologies and protocols. First, a logical port is provided based on a plurality of network physical interfaces, and the logical port is irrelevant to a specific form of the physical interface. Second, the method is irrelevant to a protocol type of a forwarded data unit, data may belong to various protocols, and it is unnecessary to parse a specific protocol corresponding to a field in the data unit.

In the method in this application, the data unit sequence stream is forwarded by using a direct mapping relationship between logical ports, and rate matching between the data unit sequence stream and a downstream egress port is implemented by adjusting the quantity of idle units. Therefore forwarding pressure of a forwarding device can be effectively reduced, a service throughput capability of the forwarding device can be effectively increased, and a data forwarding delay can be decreased, so that the method can be adapted to a delay-sensitive large-bandwidth service.

A mapping relationship between the at least one logical ingress port and the at least one logical egress port may include at least one of the following mapping relationships: a one-to-one mapping relationship between a logical ingress port in the at least one logical ingress port and a logical egress port in the at least one logical egress port; a one-to-many mapping relationship between a logical ingress port in the at least one logical ingress port and a plurality of logical egress ports in the at least one logical egress port; or a many-to-one mapping relationship between a plurality of logical ingress ports in the at least one logical ingress port and a logical egress port in the at least one logical egress port. It may be learned that, logical ingress ports and logical egress ports may form the one-to-one mapping relationship, the one-to-many mapping relationship, the many-to-one mapping relationship, and a many-to-many mapping relationship.

In a possible implementation of the first aspect, a physical interface corresponding to each logical ingress port in the at least one logical ingress port and a physical interface corresponding to each logical egress port in the at least one logical egress port are the following types of interfaces: an optical transport network OTN interface, a flexible optical transport network FlexOTN interface, an Ethernet interface, a flexible Ethernet FlexE interface, a common public radio interface CPRI, a synchronous digital hierarchy SDH interface, a fiber channel FC interface, or an infinite bandwidth InfiniBand interface.

In a possible implementation of the first aspect, the at least one first data unit includes at least one of the following data units: an OTN data unit, a FlexOTN data unit, an Ethernet packet data unit, a FlexE packet data unit, a CPRI data unit, a synchronous digital hierarchy SDH data unit, an FC data unit, or an InfiniBand data unit.

In a possible implementation of the first aspect, when the at least one logical ingress port includes at least two logical ingress ports, physical interfaces respectively corresponding to the at least two logical ingress ports are at least two of an optical transport network OTN interface, a flexible optical transport network FlexOTN interface, an Ethernet interface, a flexible Ethernet FlexE interface, a common public radio interface CPRI, a synchronous digital hierarchy SDH interface, a fiber channel FC interface, or an infinite bandwidth InfiniBand interface; and/or when the at least one logical egress port includes at least two logical egress ports, physical interfaces respectively corresponding to the at least two logical egress ports are at least two of an optical transport network OTN interface, a flexible optical transport network FlexOTN interface, an Ethernet interface, a flexible Ethernet FlexE interface, a common public radio interface CPRI, a synchronous digital hierarchy SDH interface, a fiber channel FC interface, or an infinite bandwidth InfiniB and interface.

In a possible implementation of the first aspect, the adjusting a quantity of idle units in the first data unit sequence stream includes: when the first data unit sequence stream includes an idle unit, increasing or decreasing the quantity of idle units in the first data unit sequence stream; or when the first data unit sequence stream includes no idle unit, increasing the quantity of idle units in the first data unit sequence stream. Therefore, regardless of whether the data unit sequence stream received by the first logical ingress port includes both the first data unit and an idle unit or the data unit sequence stream received by the first logical ingress port includes only the first data unit and includes no idle unit, rate matching can be performed on the data unit sequence stream received by the first logical ingress port.

In a possible implementation of the first aspect, a total bandwidth of the at least one first data unit in the first data unit sequence stream is less than or equal to a saturation bandwidth of the first logical ingress port and is less than or equal to a saturation bandwidth of the first logical egress port. By means of this configuration, it may be ensured that a service can separately match a rate of the logical ingress port and a rate of the logical egress port by adjusting an idle unit.

In a possible implementation of the first aspect, the first data unit sequence stream is an encoded data unit sequence stream; the adjusting a quantity of idle units in the first data unit sequence stream includes: decoding the first data unit sequence stream; adjusting a quantity of idle bytes in a decoded first data unit sequence stream, so that a rate of an adjusted first data unit sequence stream matches the rate of the first logical egress port; and encoding the adjusted first data unit sequence stream; and the sending the adjusted first data unit sequence stream by using the first logical egress port includes: sending an adjusted and encoded first data unit sequence stream by using the first logical egress port.

Encoding may be 64B/66B encoding, 8B/10B encoding, 512B/513B encoding, or 512B/514B encoding; and correspondingly, decoding may be 64B/66B decoding, 8B/10B decoding, 512B/513B decoding, or 512B/514B decoding.

In a possible implementation of the first aspect, the first data unit sequence stream is an encoded data unit sequence stream, and the adjusting a quantity of idle units in the first data unit sequence stream includes: adjusting a quantity of encoded idle code elements in the first data unit sequence stream, so that a rate of an adjusted first data unit sequence stream matches the rate of the first logical egress port.

In a possible implementation of the first aspect, the method further includes: obtaining a second data unit sequence stream by using a second logical ingress port, where the second data unit sequence stream includes at least one second data unit, and each second data unit in the at least one second data unit includes forwarding decision-making reference information; determining, according to the forwarding decision-making reference information, a second logical egress port corresponding to each second data unit in the at least one second data unit; caching each second data unit into a cache queue of the corresponding second logical egress port; and sending the second data unit in the second data unit sequence stream by using the second logical egress port.

The forwarding decision-making reference information may include a destination address, a forwarding label, or the like.

According to a second aspect, this application further provides a data forwarding device, and the device includes a first logical ingress port, a first logical egress port, a mapping relationship control module, and a rate matching module; where the first logical ingress port is configured to obtain a first data unit sequence stream, where the first data unit sequence stream includes at least one first data unit; the mapping relationship control module is configured to determine, according to a preconfigured mapping relationship between at least one logical ingress port and at least one logical egress port, the first logical egress port corresponding to the first logical ingress port, where the at least one logical ingress port includes the first logical ingress port; the rate matching module is configured to adjust a quantity of idle units in the first data unit sequence stream, so that a rate of an adjusted first data unit sequence stream matches a rate of the first logical egress port; and the first logical egress port is configured to send the adjusted first data unit sequence stream. The corresponding modules are configured to complete the data forwarding method according to the first aspect of this application, and details are not described herein again.

In this application, a preconfigured mapping relationship between a plurality of logical ingress ports and a plurality of logical egress ports may be updated according to an effective time period of the logical ingress port and that of the logical egress port.

The first data unit may or may not include a padding.

BRIEF DESCRIPTION OF DRAWINGS

FIG. 9 is a schematic diagram of a rate matching manner according to another embodiment of this application;

DESCRIPTION OF EMBODIMENTS

The following describes technical solutions in embodiments of this application with reference to accompanying drawings.

Terminologies such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and according to a signal having one or more data packets (for example, data from two components interacting with another component in a local system, a distributed system, and/or across a network such as the Internet interacting with other systems by using the signal).

It should be understood that, technical solutions in the embodiments of this application may be applied to an optical transport network (OTN), a flexible optical transport network (Flexible OTN, FlexOTN), an Ethernet, a flexible Ethernet (FlexE), a common public radio interface (CPRI) network, a synchronous digital hierarchy (SDH) network, an FC network, an InfiniBand network, and the like. The embodiments of this application impose no limitation on this.

The following describes a structure of data in a network applied in this application. In the embodiments of this application, a plurality of data units having substantive content (data units in different networks may be in different forms) form a data unit sequence stream, and the data unit sequence stream may or may not include an idle (IDLE) unit. Herein, the idle unit may also have different forms according to different networks. For example, the idle unit may be an idle code element or an idle byte, or may be a data gap (Inter-Packet Gap, IPG). The Ethernet is used as an example. A data unit is an Ethernet packet data unit, an idle unit may be inserted between Ethernet packet data units, and the idle unit may be an idle code element or an idle byte.

Figure 1:
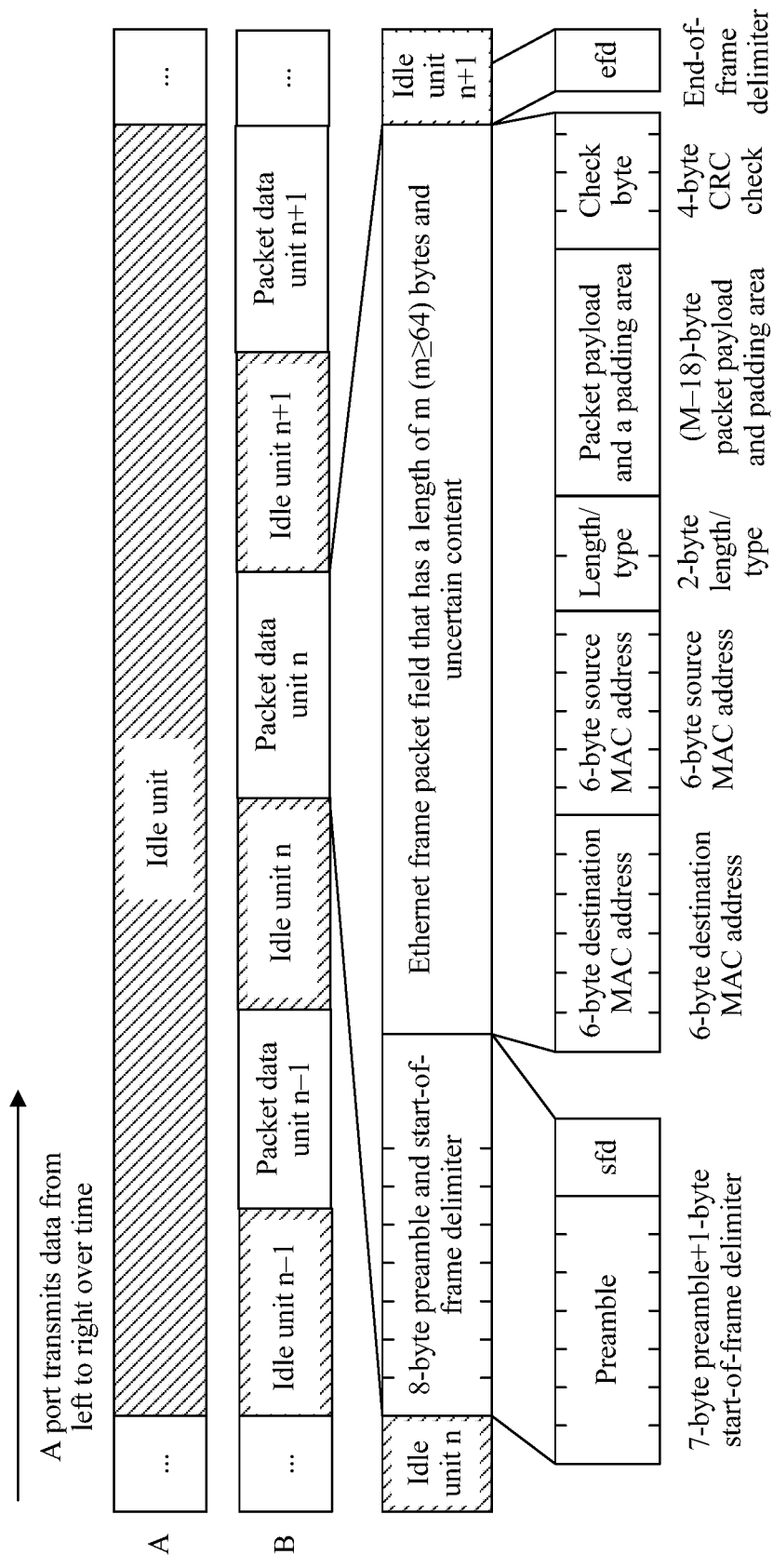
FIG. 1 is a schematic structural diagram of an Ethernet packet data unit sequence stream.

Specifically, FIG. 1 is a schematic structural diagram of an Ethernet packet data unit sequence stream. Ports (including an ingress port and an egress port) of an Ethernet packet device transmit data from left to right over time. When there is no Ethernet packet data unit to be transmitted, an idle unit (which is usually an idle code element formed after an idle byte is encoded) is constantly transmitted; or when there is an Ethernet packet data unit to be transmitted, the Ethernet packet data unit (which is also usually an encoded Ethernet packet data unit) is transmitted. In the figure, for brevity, the Ethernet packet data unit is written as a packet data unit for simplification.

As shown in FIG. 1, in a case A, an Ethernet port has no Ethernet packet data unit to send in a specific period of time, and the Ethernet port continuously sends an idle unit, so as to maintain a normal sending state and a normal receiving state of hardware on both sides of the Ethernet port. In a case B, there is an Ethernet packet data unit that needs to be transmitted in another period of time, and a packet data unit sequence stream including the Ethernet packet data unit and an idle unit is sent. The figure mainly shows a packet data unit n−1, a packet data unit n, a packet data unit n+1, and an idle unit between the packet data units.

The Ethernet packet data unit usually has a variable length within a specific range. For a sending side, an idle unit between two Ethernet packet data units usually includes at least 12 bytes and has an unlimited length. Particularly, in some special cases, a required minimum quantity of bytes corresponding to the idle unit may vary. For example, a quantity that is of bytes of a smallest inter-frame idle unit and that is allowed on a receiving side in a 10 Gigabit Ethernet (10GE) is 5, and a quantity that is of bytes of a smallest inter-frame idle unit and that is allowed on a receiving side in a 100 Gigabit Ethernet (100GE) is 1.

Typical encapsulation of the Ethernet packet data unit is shown in FIG. 1, and an octet (or referred to as a byte) is used as a basic unit. An Ethernet packet data unit first includes a preamble "0x55 0x55 0x55 0x55 0x55 0x55 0x55" including first seven bytes and a 1-byte start-of-frame delimiter SFD (SFD) "0xDS". Next, there are a destination MAC address of a 6-byte length, a source MAC address of a 6-byte length, a packet type/length information of a 2-byte length, and packet payload information of a specific length of at least 46 bytes and a padding information byte (when a payload is less than 46 bytes, the payload is padded by using a padding (Pad/padding, PAD) byte until the payload reaches 46 bytes). At a last location, there is a 4-byte frame check byte, such as cyclic redundancy code (CRC) check, used to check packet integrity. A first byte in an idle unit behind the Ethernet packet data unit is used as a control byte and is specifically an end-of-frame delimiter EFD (EFD).

In an Ethernet, the Ethernet port usually appears as a logical data-oriented concept and is referred to as a logical port or is briefly referred to as a port, and an Ethernet physical interface appears as a hardware concept and is referred to as a physical interface or is briefly referred to as an interface. Usually, a MAC address is used to mark an Ethernet port. Conventionally, a rate of the Ethernet port is determined based on a rate of the Ethernet physical interface. Usually, a maximum bandwidth of the Ethernet port corresponds to a bandwidth of the Ethernet physical interface, such as an Ethernet physical interface of 10 Mbps, 100 Mbps, 1000 Mbps (1 Gbps), 10 Gbps, 40 Gbps, 100 Gbps, 400 Gbps, or the like.

The Ethernet is widely used and rapidly developed over a considerable period of time in the past. The rate of the Ethernet port is increased by 10 times and continuously evolves and develops from 10 Mbps to 100 Mbps, 1000 Mbps (1 Gbps), 10 Gbps, 40 Gbps, 100 Gbps, and 400 Gbps. As a technology develops, a difference between bandwidth granularities becomes larger, and a deviation from an actual application requirement expectation is more likely to appear. An increase of bandwidth required by a mainstream application does not show such a 10-time increase feature, for example, the bandwidth increases to 50 Gbps, 75 Gbps, or 200 Gbps. In the industry, it is expected that support for an Ethernet port (a virtual connection) with a bandwidth of 50 Gbps, 60 Gbps, 75 Gbps, 200 Gbps, 150 Gbps, or the like is provided.

On the one hand, it is further expected that some ports with flexible bandwidths can be provided. These ports may share one or more Ethernet physical interfaces. For example, two 40GE ports and two 10GE ports share a 100G physical interface. In addition, a rate can be flexibly adjusted as a requirement varies, for example, the rate is adjusted from 200 Gbps to 330 Gbps or from 50 Gbps to 20 Gbps, so as to improve usage efficiency of the port or prolong a usage life cycle of the port. Fixed-rate physical links may be cascaded and bundled to support a stack-based increase of a logical port rate (for example, two 100GE physical interfaces are stacked, cascaded, and bundled to support a 200GE logical port). On the other hand, bandwidths obtained by flexibly stacking physical interfaces can be used as a resource pool, and a bandwidth in the resource pool is allocated to a particular Ethernet logical port according to a granularity (for example, 5G is one granularity), thereby implementing highly efficient sharing, by several Ethernet virtual connections, of a physical link group obtained by means of stacking and cascading.

Therefore, a concept of a flexible Ethernet (FlexE) appears, and the flexible Ethernet is also referred to as a flexible virtual Ethernet. The FlexE supports functions for an Ethernet service, for example, a subrate function, a channelization function, and an inverse multiplexing function. For example, in a subrate application scenario of the Ethernet service, the FlexE can support transmission of a 250G Ethernet service (a MAC code stream) by using three existing 100GE physical interfaces. In an inverse multiplexing scenario of the Ethernet service, the FlexE can support transmission of a 200G Ethernet service by using two existing 100GE physical medium dependent (PMD) sublayers. In a channelization scenario of the Ethernet service, the FlexE can support several logical ports in sharing one or more physical interfaces, and can support multiplexing of a plurality of low-rate Ethernet services to a high-rate flexible Ethernet.

Because the Ethernet is widely used as a service interface in an access network and a metropolitan area network, the FlexE technology based on a service traffic aggregation function of the Ethernet technology can implement a seamless connection to an Ethernet interface in an underlying service network. Introduction of the subrate, channelization, and inverse multiplexing functions of the FlexE significantly extends application scenarios of the Ethernet, improves flexibility of Ethernet application, and enables the Ethernet technology to gradually penetrate into a transport network field.

The FlexE provides a feasible evolution direction for virtualization of an Ethernet physical link. The flexible Ethernet needs to support several virtual Ethernet data connections on a group of cascaded physical interfaces. For example, four 100GE physical interfaces are cascaded and bundled to support several logical ports. If bandwidths of some logical ports in the several logical ports decrease, bandwidths of other logical ports increase, and a sum of decreased bandwidths is equal to a sum of increased bandwidths. Bandwidths of the several logical ports are rapidly and flexibly adjusted to share the four 100GE physical interfaces.

With reference to an SDH/OTN technology, the FlexE constructs a fixed frame format for physical interface transmission and performs timeslot division for time division multiplexing (Time Division Multiplexing, TDM). Different from that for the SDH/OTN, a FlexE timeslot division granularity for TDM is 66 bits, and may exactly correspondingly carry a 64B/66B code block. A FlexE frame includes eight rows, a first 66b block location in each row is a FlexE overhead area, and behind the overhead area, there is a payload area in which timeslot division is performed. The timeslot division is performed in a granularity of 66 bits, and the payload area corresponds to 20×1023 66-bit carrying spaces. A bandwidth of a 100GE interface is divided into 20 timeslots, and a bandwidth of each timeslot is approximately 5 Gbps.

Several physical interfaces may be cascaded and bundled, and all timeslots of the several physical interfaces may carry an Ethernet logical port in a combined manner. For example, a 10GE requires two timeslots, a 25GE requires five timeslots, and so on. A sequentially transmitted 66b code block may still be visible on the logical port. Each logical port corresponds to a MAC, transmits a corresponding Ethernet packet, and has same manners, as the conventional Ethernet, for starting and finishing transmitting a packet and for identifying idle padding.

Figure 2:
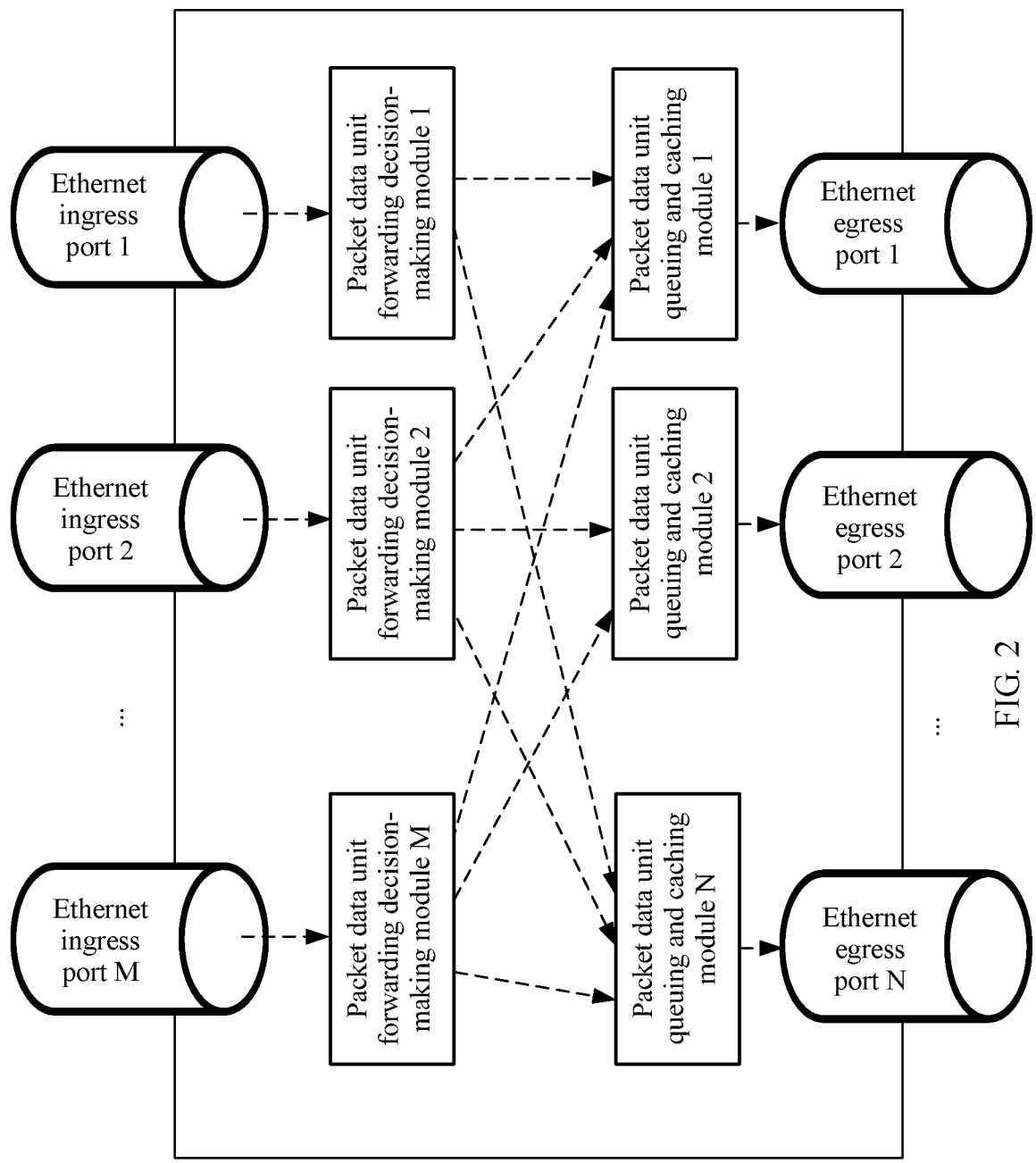
FIG. 2 is a schematic diagram of an existing packet data forwarding procedure.

FIG. 2 is a schematic diagram of an existing packet data forwarding procedure. In an example shown in FIG. 2, a packet device has M Ethernet ingress ports (an Ethernet ingress port 1, an Ethernet ingress port 2, . . . , and an Ethernet ingress port M), and each Ethernet ingress port corresponds to a respective packet data unit forwarding decision-making module. The M Ethernet ingress ports are corresponding to a total of M packet data unit forwarding decision-making modules (a packet data unit forwarding decision-making module 1, a packet data unit forwarding decision-making module 2, . . . , and a packet data unit forwarding decision-making module M). The packet device has N Ethernet egress ports (an Ethernet egress port 1, an Ethernet egress port 2, . . . , and an Ethernet egress port N). Each Ethernet egress port corresponds to a respective packet data unit queuing and caching module. The N Ethernet egress ports are corresponding to a total of N packet data unit queuing and caching modules (a packet data unit queuing and caching module 1, a packet data unit queuing and caching module 2, . . . , and a packet data unit queuing and caching module N).

It should be understood that, the packet data forwarding procedure shown in FIG. 2 may correspond to a conventional standard Ethernet or a flexible Ethernet. The Ethernet ingress port in FIG. 2 is a logical concept. In the standard Ethernet, because no timeslot division is performed for a physical interface, one Ethernet ingress port may correspond to one or more physical interfaces. In the flexible Ethernet, one Ethernet ingress port may correspond to one or more physical interfaces, or one Ethernet ingress port may correspond to one or more timeslots of one or more physical interfaces.

As described above, when a packet data unit sequence stream reaches the packet device, a packet data unit forwarding decision-making module of a corresponding Ethernet ingress port needs to identify a MAC address of each packet data unit, and performs matching on a destination MAC address of the packet data unit by means of table lookup, so as to obtain an Ethernet egress port. Then, caching and queuing are performed on the packet data unit by using a packet data unit queuing and caching module corresponding to the found Ethernet egress port, and the packet data unit waits to be sent through the Ethernet egress port. Table lookup and data cache storage cost a large quantity of hardware resources, and consequently, the packet device has high costs and is in a limited scale. In addition, uncertain data cache storage and table lookup cause an uncertainly high delay. As a result, it is difficult for the packet device to adapt to some delay-sensitive applications.

For the foregoing case, an embodiment of this application provides a data forwarding method, including: obtaining a first data unit sequence stream by using a first logical ingress port, where the first data unit sequence stream includes at least one first data unit; determining, according to a preconfigured mapping relationship between at least one logical ingress port and at least one logical egress port, a first logical egress port corresponding to the first logical ingress port, where the at least one logical ingress port includes the first logical ingress port; adjusting a quantity of idle units in the first data unit sequence stream, so that a rate of an adjusted first data unit sequence stream matches a rate of the first logical egress port; and sending the adjusted first data unit sequence stream by using the first logical egress port.

The first logical ingress port corresponds to at least one physical ingress interface or at least one timeslot of at least one physical ingress interface, and the first logical egress port corresponds to at least one physical egress interface or at least one timeslot of at least one physical egress interface. Logical ingress ports and/or logical egress ports may be classified according to a bandwidth required by a service. For a specific classification manner, refer to an existing standard. This embodiment of this application imposes no limitation on this.

If receiving and sending functions of a port are not considered, both the logical ingress port and the logical egress port are logical ports. Specifically, a FlexE is used as an example. The FlexE divides timeslots of an Ethernet physical interface, for example, for a 100GE, 20 5G-bandwidth timeslots are obtained by means of division, and several 100GEs (for example, m 100GEs) may be cascaded to form a FlexE group (FlexE Group) having a total of 20×m timeslots. These timeslots may be randomly combined to form several logical ports of different sizes, and a bandwidth of each logical port is an integer multiple of a 5G bandwidth. One logical port may correspond to one conventional Ethernet physical interface. One logical port may correspond to a plurality of conventional Ethernet physical interfaces. The logical port may be further formed by combining a corresponding timeslot, for example, formed by combining at least one timeslot of one Ethernet physical interface or a plurality of timeslots of a plurality of Ethernet physical interfaces.

Figure 3:
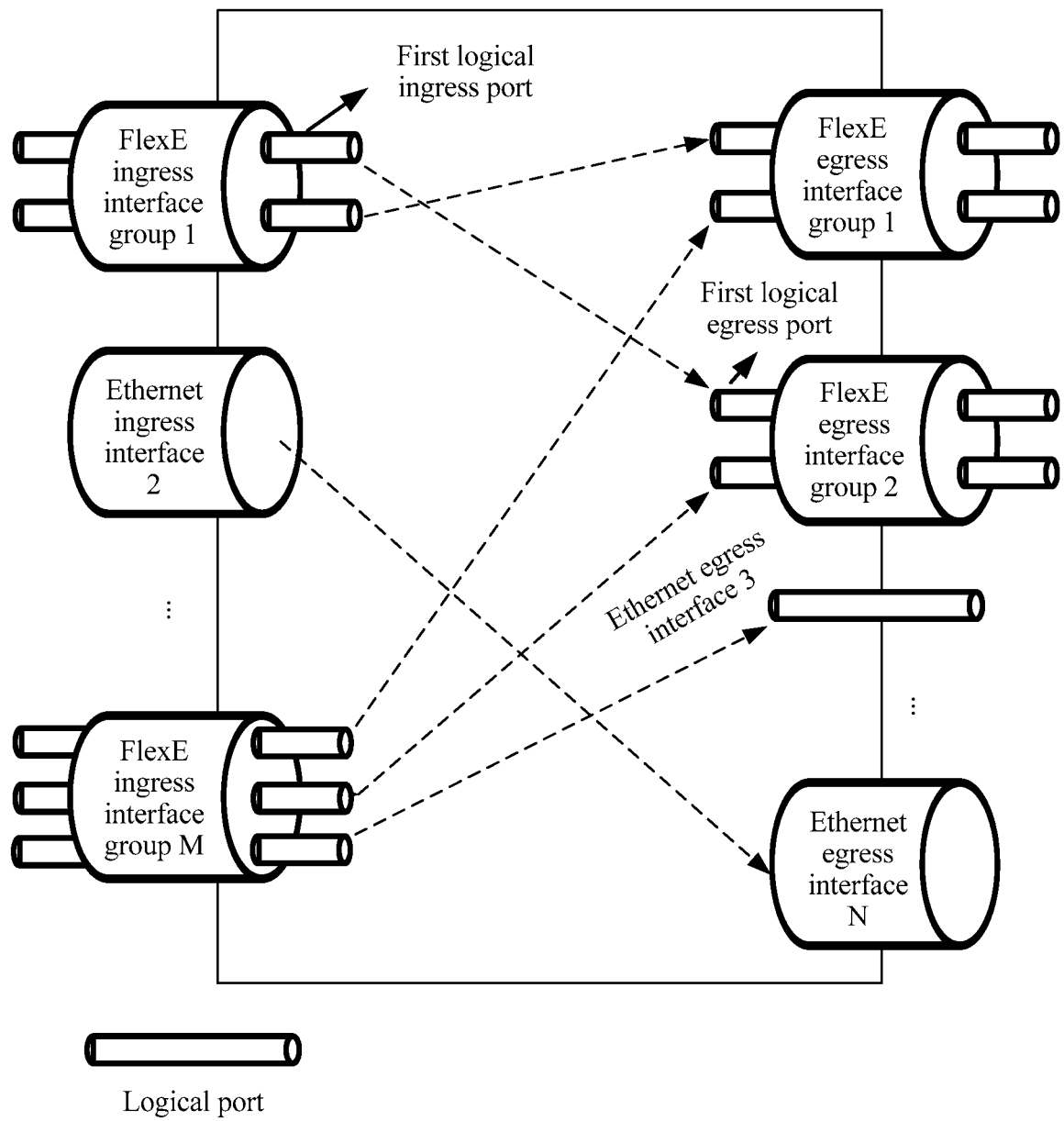
FIG. 3 is a schematic diagram of a data forwarding method according to an embodiment of this application.

FIG. 3 is a schematic diagram of a data forwarding method according to an embodiment of this application. FIG. 3 shows a plurality of logical ports. For a first logical ingress port and a first logical egress port, the first logical ingress port corresponds to some timeslots of a FlexE ingress interface group 1 (at least one physical interface), and the first logical egress port corresponds to some timeslots of a FlexE egress interface group 2 (at least one physical interface). The first logical ingress port receives a first data unit sequence stream and directly forwards the first data unit sequence stream to the first logical egress port without processing content. In the figure, each FlexE ingress interface group may correspond to one or more logical ingress ports, each FlexE egress interface group may correspond to one or more logical egress ports, each Ethernet ingress interface may correspond to one logical ingress port, and each Ethernet egress interface may correspond to one logical egress port. The figure only schematically shows a case of an Ethernet interface and a FlexE interface group, and the method in this embodiment of this application may be further applied to a scenario including another type of interface. Another logical ingress port and logical egress port other than the first logical ingress port and the first logical egress port that are shown in FIG. 3 forward a data unit sequence stream in a similar process, and details are not described herein again.

It should be understood that, a quantity of logical ingress ports and a quantity of logical egress ports that are shown in FIG. 3 are only examples, and the method in this embodiment of this application is applicable to a case including at least one logical ingress port and at least one logical egress port.

It should be understood that, in this embodiment of this application, not only one-to-one data forwarding may be supported, but also a plurality of logical ingress ports may correspond to one logical egress port. In this case, a total bandwidth of the plurality of logical ingress ports is required to be equal to a bandwidth of the logical egress port, that is, a bandwidth of a downstream pipeline is equal to a total bandwidth of an upstream pipeline. That the plurality of logical ingress ports correspond to one logical egress port may be considered as data aggregation.

In this embodiment of this application, one logical ingress port may correspond to a plurality of logical egress ports. In this case, a data unit sequence stream received by the logical ingress port is directly duplicated to obtain a plurality of copies, and the plurality of copies are respectively sent to the plurality of corresponding logical egress ports. That is, the method in this embodiment of this application may support one-to-many (multicast) forwarding and many-to-one (aggregation) forwarding.

Correspondingly, a mapping relationship between the at least one logical ingress port and the at least one logical egress port includes at least one of the following mapping relationships: a one-to-one mapping relationship between a logical ingress port in the at least one logical ingress port and a logical egress port in the at least one logical egress port; a one-to-many mapping relationship between a logical ingress port in the at least one logical ingress port and a plurality of logical egress ports in the at least one logical egress port; or a many-to-one mapping relationship between a plurality of logical ingress ports in the at least one logical ingress port and a logical egress port in the at least one logical egress port.

It should be understood that, in this embodiment of this application, when the at least one logical ingress port includes at least two logical ingress ports, physical interfaces respectively corresponding to the at least two logical ingress ports are at least two of an optical transport network OTN interface, a flexible optical transport network FlexOTN interface, an Ethernet interface, a flexible Ethernet FlexE interface, a common public radio interface CPRI, a synchronous digital hierarchy SDH interface, a fiber channel FC interface, or an infinite bandwidth InfiniBand interface; and/or when the at least one logical egress port includes at least two logical egress ports, physical interfaces respectively corresponding to the at least two logical egress ports are at least two of an optical transport network OTN interface, a flexible optical transport network FlexOTN interface, an Ethernet interface, a flexible Ethernet FlexE interface, a common public radio interface CPRI, a synchronous digital hierarchy SDH interface, a fiber channel FC interface, or an infinite bandwidth InfiniBand interface. That is, the data forwarding method and device in this embodiment of this application may be based on a plurality of network technologies and protocols. First, a logical port is provided based on a plurality of network physical interfaces, and the logical port is irrelevant to a specific form of the physical interface. Second, the method is irrelevant to a protocol type of a forwarded data unit, data may belong to various protocols, and it is unnecessary to parse a specific protocol corresponding to a field in the data unit.

It should be further understood that, in this embodiment of this application, a type of a physical interface corresponding to the first logical ingress port may be the same as or different from a type of a physical interface corresponding to the first logical egress port. This embodiment of this application imposes no limitation on this.

It should be noted that, embodiments of this application do not limit a specific rate or type of the physical interface, or a measure or granularity for timeslot division. For example, a physical interface corresponding to each logical ingress port in the at least one logical ingress port and a physical interface corresponding to each logical egress port in the at least one logical egress port are the following types of interfaces: an optical transport network OTN interface, a flexible optical transport network FlexOTN interface, an Ethernet interface, a flexible Ethernet FlexE interface, a common public radio interface CPRI, a synchronous digital hierarchy SDH interface, a fiber channel FC interface, or an infinite bandwidth InfiniBand interface. In the embodiments of this application, usually, when one logical port corresponds to a plurality of physical interfaces or a plurality of timeslots of a plurality of physical interfaces, interface types of the plurality of physical interfaces may be the same. However, this embodiment of this application imposes no limitation on this.

In this embodiment of this application, a forwarding device receives a data unit sequence stream by using a logical ingress port. The first data unit sequence stream includes at least one first data unit. The first data unit may also be understood as a service data unit or a packet. The at least one first data unit may include at least one of the following data units: an OTN data unit, a FlexOTN data unit, an Ethernet packet data unit, a FlexE packet data unit, a CPRI data unit, a synchronous digital hierarchy SDH data unit, an FC data unit, or an InfiniBand data unit. The first data unit may or may not include a padding. Whether the padding byte is included is related to a type of the first data unit. It should be further understood that, in addition to a data unit, data unit sequence streams received through different types of interfaces and different networks may further include at least one idle unit. The following uses an example to describe in detail a data unit sequence stream, a data unit included in the data unit sequence stream, and an idle unit that may be included in the data unit sequence stream.

A data unit sequence stream received by using each of the Ethernet interface, the FlexE interface, the FC interface, and the InfiniBand interface includes both a data unit and an idle unit. It should be noted that, the idle unit in this embodiment of this application may also be referred to as idle information. For example, in an Ethernet, an idle unit is unnecessarily in a data format, obtained after decoding, on a media independent interface (MII), that is, out-of-band information transmit (character) control (signal) (Transmit (character) Control (signals), TXC) or out-of-band information receive (character) control (signal) (Received (character) Control (signals), RXC) assists in indicating whether there is an idle byte; and the idle unit is unnecessarily a 10-bit idle code element that is obtained by encoding transmit (character) data (Transmit (character) Data, TXD) and TXC together and that is in an 8B/10B code block data format, or an idle code element in a 64B/66B code block data format, that is, a data format of the data unit or the idle unit is explicitly indicated.

The first data unit sequence stream may be an encoded data unit sequence stream. That is, at least one first data unit in the first data unit sequence stream may be an encoded data unit. Further, because the data unit sequence stream not only includes the data unit but also includes the idle unit, at least one data unit and an accompanying idle unit that are included in the data unit sequence stream may be encoded. Herein, encoding may be 64B/66B encoding, 8B/10B encoding, 512B/513B encoding, or 512B/514B encoding. A code element obtained by means of 64B/66B encoding corresponds to 8-byte original data, and a code element obtained by means of 8B/10B encoding corresponds to 1-byte original data.

In a specific example, when data is from the Ethernet, a first data unit in a first data unit sequence stream received by using the Ethernet interface may include a 64B/66B start control code block that uses 0b10 as a synchronization header and whose type is 0x33 or 0x78, a 64B/66B data code block that uses 0b01 as a synchronization header, and a 64B/66B end control code block that uses 0b10 as a synchronization header and whose type is 0x87, 0x99, 0xAA, 0xB4, 0xCC, 0xD2, 0xA1, or 0xFF (sequentially corresponding to locations 1 to 8 of an end character in an 8-byte code block). A data unit obtained by means of 8B/10B encoding is similar to a data unit obtained by means of 64B/66B encoding, 1 byte is encoded as 10 bits, and correspondingly, the first data unit may include an 8B/10B start control code block, a data code block, and an 8B/10B end control code block. The first data unit sequence stream may include control information indicating a start, a continuation, and an end of the data unit or indicating existence and a continuation of the idle unit.

At least one first data unit in the first data unit sequence stream may not be encoded. In a specific example, when data is from the Ethernet, the first data unit sequence stream indicates, by using out-of-band control information TXC/RXC 0 or 1 of an MII interface such as an XGMII/a CGMII, a start (TXC/RXC changes from 1 to 0), a continuation, and an end (TXC/RXC changes from 0 to 1) of the data unit, and existence and a continuation (TXC/RXC=1) of the idle unit. It should be understood that, instead of the foregoing control information, another manner such as a pointer and a storage address may be used to indicate, inside a chip or a computer system, the data unit or the idle unit of the first data unit sequence stream.

A data unit sequence stream received by using a logical port on the FlexE interface is similar to a data unit sequence stream received by using the Ethernet interface (which is also a logical port), and includes a packet data unit of an Ethernet protocol and an idle unit of the Ethernet protocol. Details are not described herein.

An FC data unit sequence stream received by using the FC interface (which is also a logical port) includes an FC data unit and an idle unit of an FC protocol. An InfiniB and data unit sequence stream received by using the InfiniBand interface (which is also a logical port) includes an InfiniBand packet data unit and an idle unit of an InfiniBand network protocol. The FC and the InfiniBand are packet network protocol technologies based on a statistical multiplexing technology. An FC data unit and an InfiniBand data unit each is similar to an Ethernet packet data unit. An idle unit between FC data units and that between InfiniBand data units each is similar to an Ethernet idle unit.

The FC data unit sequence stream is used as an example for detailed description, the data unit in the FC data unit sequence stream is an FC frame, and the idle unit is a fill word (4 bytes). In the FC data unit, that is, in the FC frame, 4 bytes form a word (Word), and a length of the FC frame is an integer multiple of 4 bytes. For the FC data unit sequence stream, at least two fill words or at least six service primitive words (at least four service primitive words are fill words) are generally required between FC frames.

Figure 4:
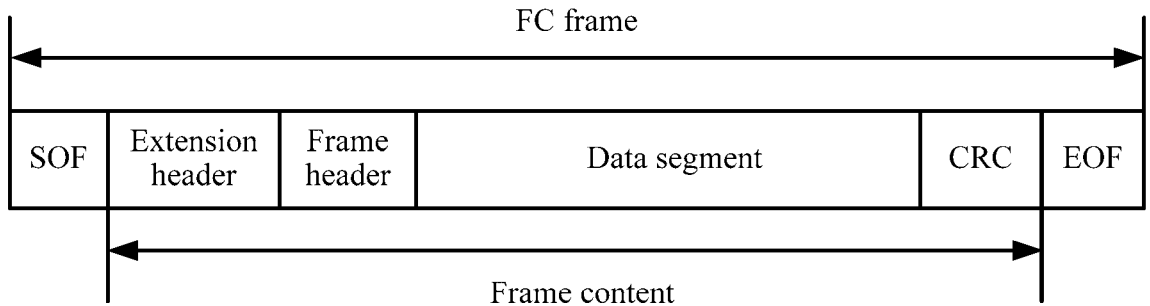
FIG. 4 is a schematic structural diagram of an FC frame.

An FC frame on which encoding (8B/10B encoding or 64B/66B encoding) is not performed has a structure shown in FIG. 4. The FC frame usually starts with a 4-byte start of frame (SOF) word followed by frame content, and finally ends with a 4-byte end of frame (EOF) word. The frame content part includes a 24-byte frame header (frame header), a data segment (data field), and 4-byte cyclic redundancy check (CRC). The frame content may further include an extension header (extended header). The data segment is an integer multiple of 4 bytes and is usually 0 to 2112 bytes.

For an FC data unit sequence stream obtained by means of 64B/66B encoding, an idle unit of the FC data unit sequence stream may be referred to as an idle code block, a typical idle code block corresponds to two fill words, and an FC idle code block is consistent with an Ethernet idle code block. Any two of various FC service primitive words, including the fill word, are combined, and 64B/66B encoding may be performed to obtain a code block sequence that is consistent with a code block sequence obtained by means of 64B/66B encoding in the Ethernet. A case of using 8B/10B encoding is similar to this.

However, a data unit sequence stream received by using the OTN interface, the FlexOTN interface, the CPRI, or the SDH interface includes only a data unit in a corresponding format, and includes no idle unit.

The following uses a CPRI data unit as an example for description. There are a plurality of different rate options in a CPRI technology, and the different rate options are as follows:

CPRI line bit rate option 1: 614.4 Mbit/s, 8B/10B line coding (1×491.52×10/8 Mbit/s)
CPRI line bit rate option 2: 1228.8 Mbit/s, 8B/10B line coding (2×491.52×10/8 Mbit/s)
CPRI line bit rate option 3: 2457.6 Mbit/s, 8B/10B line coding (4×491.52×10/8 Mbit/s)
CPRI line bit rate option 4: 3072.0 Mbit/s, 8B/10B line coding (5×491.52×10/8 Mbit/s)
CPRI line bit rate option 5: 4915.2 Mbit/s, 8B/10B line coding (8×491.52×10/8 Mbit/s)
CPRI line bit rate option 6: 6144.0 Mbit/s, 8B/10B line coding (10×491.52×10/8 Mbit/s)
CPRI line bit rate option 7: 9830.4 Mbit/s, 8B/10B line coding (16×491.52×10/8 Mbit/s)
CPRI line bit rate option 7A: 8110.08 Mbit/s, 64B/66B line coding (16×491.52×66/64 Mbit/s)
CPRI line bit rate option 8: 10137.6 Mbit/s, 64B/66B line coding (20×491.52×66/64 Mbit/s)
CPRI line bit rate option 9: 12165.12 Mbit/s, 64B/66B line coding (24×491.52×66/64 Mbit/s)
CPRI line bit rate option 10: 24330.24 Mbit/s, 64B/66B line coding (48×491.52×66/64 Mbit/s)

A structure of a CPRI basic frame of a CPRI interface protocol is first described and is specifically shown in Table 1. The basic frame is in a unit of a byte and has a fixed frame length. A CPRI basic frame with the rate option 1 includes a total of 16 words, and each word includes 1 byte. A first word in the 16 words is a control word and represents a start of the basic frame, and remaining 15 words are data words. A CPRI basic frame with the rate option 2 includes a total of 16 words, and each word includes 2 bytes. Similarly, a CPRI basic frame with the rate option 7/7A that is not shown in the table includes a total of 16 words, and each word includes 16 bytes. Therefore, a length of the basic frame is an integer multiple of 8 bytes and may be an integer quantity of 64B/66B code blocks.

TABLE 1

| Structure of a CPRI basic frame |||||||||||||||||||
|---|---|---|---|---|---|---|---|---|---|---|---|---|---|---|---|---|---|---|
| | Y = 0 |||||||| Y = 0 |||||||| Y = 1 ||||||||
| | 00 A | 01 B | 02 C | 03 D | 04 E | 05 F | 06 G | 07 H | 00 A | 01 B | 02 C | 03 D | 04 E | 05 F | 06 G | 07 H | 08 A | 09 B | 10 C | 11 D | 12 E | 13 F | 14 G | 15 H |
| One control word | 0 | Control byte #Z.X.W.Y = #Z.X.W.0 ||||||| One control word | 0 | Control byte #Z.X.W.Y = #Z.X.W.0 ||||||| Control byte #Z.X.W.Y = #Z.X.W.1 |||||||
| Data block 15 data words | 1 2 3 4 5 6 7 8 9 10 11 12 13 14 15 | | | | | | | | Data block 15 data words | 1 2 3 4 5 6 7 8 9 10 11 12 13 14 15 | | | | | | | | | | | | | | |
| | Structure of a CPRI basic frame with a rate of 1 × 491.52 (Mbps) ||||||||  Structure of a CPRI basic frame with a rate of 2 × 491.52 (Mbps) |||||||||||||||||

256 CPRI basic frames form one CPRI super frame, and a first word of the CPRI super frame is a synchronization header control word and may represent a start of the CPRI super frame. A length of the CPRI super frame is fixed for a selected rate option, and therefore, locations of a frame start, a continuation, and a frame end of the CPRI super frame may be determined.

For a rate option for which 64B/66B encoding is performed, first 8 bytes and second 8 bytes of a control word (a synchronization word) of a first basic frame of the CPRI super frame are respectively encoded as a 64B/66B control code block whose synchronization header is 0b10 and whose type is 0xFF and a 64B/66B control code block whose synchronization header is 0b10 and whose type is 0×78, so as to mark a frame start, a continuation, and a frame end of the CPRI super frame. All remaining data is encoded as a data code block whose synchronization header is 0b01. It may be learned that, a CPRI interface data unit sequence stream is in a form that is consistent with a form of each of the Ethernet data unit and the FC data unit that are described above. If the CPRI data unit sequence stream, the Ethernet data unit sequence stream, and the FC data unit sequence stream are all encoded by means of 64B/66B encoding, the CPRI data unit sequence stream differs from the Ethernet data unit sequence stream and the FC data unit sequence stream mainly in that there is no idle code block between data units in the CPRI data unit sequence stream.

An OTN data unit is further used as an example for brief description. The OTN data unit is an OTU-k frame, and the OTU-k frame is a frame structure of a fixed size. The OTU-k frame includes 4 rows and 4080 columns that are 4×4080=16320 bytes in total. 14-byte OTU-k frame overheads include SM, GCCO, and RES that are 7 bytes in total, and frame synchronization overheads FAS and MFAS that are 7 bytes in total. A 6-byte overhead FAS is a fixed sequence, and the fixed sequence is similar to a preamble sequence in the Ethernet. The overhead FAS is used as a mark of a frame start of the OTU-k frame. Because the OTU-k frame is the frame structure of a fixed size, locations of the frame start, a continuation, and a frame end of the OTU-k frame may be determined. The OTN data unit is in a form that is consistent with a form of each of the Ethernet data unit, the FC data unit, and the CPRI data unit that are described above.

It should be understood that, one data unit in this embodiment of this application may correspond to one or a larger quantity of data frames, and even an infinite quantity of data frames that are broadcast on a logical port may be considered as one data unit. Herein, the data frame may be the FC frame, the CPRI super frame, the OTU-k frame, or the like described above.

In conclusion, data units that are closer to a packet format, for example, the Ethernet data unit, the FlexE data unit, the FC data unit, and the Infiniband data unit, have a similar format, and data units that are closer to a frame format, for example, the OTN data unit, the FlexOTN data unit, the CPRI data unit, and the SDH data unit, also have a similar format, and locations of a start, a continuation, and an end of the data unit may be determined by using various identifiers.

It should be understood that, a protocol type of a data unit sequence stream received by a logical ingress port in this embodiment of this application is unnecessarily the same as a type of a physical interface corresponding to the logical ingress port. For example, because a data unit in a data unit sequence stream received by a logical ingress port corresponding to an OTN physical interface is forwarded by an upstream forwarding device, the data unit may belong to an Ethernet protocol. This is merely an example for description and is not intended to limit this embodiment of this application.

In this embodiment, the first logical egress port corresponding to the first logical ingress port that receives the first data unit sequence stream is determined according to the preconfigured mapping relationship between the at least one logical ingress port and the at least one logical egress port. An implementation form of the mapping relationship between the at least one logical ingress port and the at least one logical egress port may be a configuration table or a component that is built into the forwarding device. The mapping relationship may be modified or replaced by a network administrator. This embodiment of this application imposes no limitation on this.

Optionally, the mapping relationship may be stored and used in a form of a table in a network management computer system. However, the mapping relationship in this embodiment of this application is different from a correspondence, in an existing solution, between a destination address (for example, a destination MAC address) and an egress port. The mapping relationship in this embodiment of this application directly includes a relationship between a logical ingress port and a logical egress port. Therefore, integrity check such as CRC check does not need to be performed on a data unit, content of the data unit does not need to be processed, and table lookup processing does not need to be performed for a destination address. Each logical egress port is exclusive relative to a logical ingress port and is preconfigured, and therefore, data units in a data unit sequence stream arriving through the logical ingress port are directly sent through the logical egress port without performing table lookup, queuing, or caching on the data units one by one.

Data received by a specific logical ingress port in this embodiment of this application may be obtained by gathering data obtained after grouping and identification are performed in another upstream device of a forwarding device, or may be obtained by gathering data in another manner. This embodiment of this application imposes no limitation on this.

Figure 5:
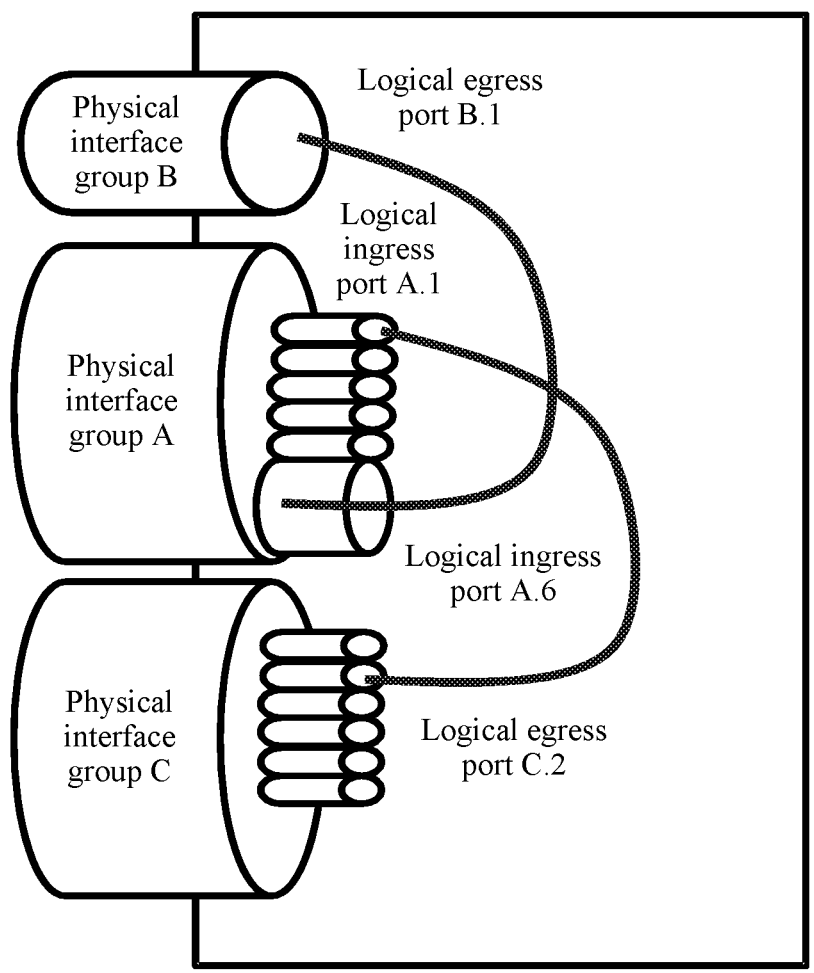
FIG. 5 is a schematic diagram of a mapping relationship between a logical ingress port and a logical egress port according to an embodiment of this application.

Specifically, from a perspective of service management, data unit forwarding in this embodiment of this application may be based on static and semi-static configuration. Detailed descriptions are provided with reference to FIG. 5, and Table 2 to Table 5. FIG. 5 is a schematic diagram of a mapping relationship between a logical ingress port and a logical egress port according to an embodiment of this application. In FIG. 5, there are three physical interface groups: a physical interface group A, a physical interface group B, and a physical interface group C. A type of a physical interface in the physical interface group may be the type mentioned above. In a specific example, the physical interface group B may be a standard Ethernet interface group, the physical interface group A may be a FlexE interface group, and the physical interface group C may be a FlexOTN interface group. A logical ingress port A.1 and a logical ingress port A.6 respectively correspond to some timeslots of the physical interface group A. For details, refer to Table 2. A logical egress port B.1 corresponds to the whole physical interface group B. For details, refer to Table 3. A logical egress port C.2 corresponds to some timeslots of the physical interface group C. For details, refer to Table 4. In Table 2 to Table 4, a data unit sequence stream identifier may be further allocated to each logical port to distinguish the data unit sequence streams. Table 5 provides a mapping relationship between a logical ingress port and a logical egress port. For example, the logical ingress port A.1 corresponds to the logical egress port C.2, the logical ingress port A.6 corresponds to the logical egress port B.1, and this belongs to the foregoing described data forwarding method in this embodiment of this application. Table 5 further provides per-data unit table lookup, storage, and forwarding that need to be performed on a data unit sequence stream received by a logical ingress port A.2 that is not shown in FIG. 5, and a specific switching manner is described in detail in the following.

A configuration table is simple and easy to maintain, and is usually configured by a network administrator or automatically configured by using a protocol. The configuration table mainly includes allocation and identification of a timeslot of an interface group corresponding to a logical port, and specifically includes a mapping relationship between timeslot allocation for a physical interface and a logical port (Table 2 to Table 4), and includes a configuration of a mapping relationship between ports that perform non-delay forwarding (Table 5). The foregoing mapping relationships are simple and brief, may be considered as some abstracted tables, and may actually exist without being in a form of a table. These mapping relationships are generally stored in a management system, and are built, on a data plane, as hardware configurations of a device, so as to avoid and reduce a problem that the forwarding device performs large-scale table lookup maintenance and lookup of massive table entries according to a packet protocol address and a label, thereby implementing non-table forwarding.

TABLE 2

Physical interface group A-logical port configuration table

| Logical ingress port | Timeslot number | Stream identifier ID |
| --- | --- | --- |
| A.1 | 1 | 0x33 |
| ... | ... | ... |
| A.6 | (11, 12, 13, 19) | 0x66 |

TABLE 3

Physical interface group B-logical port configuration table

| Logical egress port | Timeslot number | Stream identifier ID |
| --- | --- | --- |
| B.1 | — | — |

TABLE 4

Physical interface group C-logical port configuration table

| Logical egress port | Timeslot number | Stream identifier ID |
| --- | --- | --- |
| ... | ... | ... |
| C.2 | 2 | 0xBB |
| ... | ... | ... |

TABLE 5

Logical ingress port-logical egress port configuration table

| Logical ingress port | Processing type | Logical egress port |
| --- | --- | --- |
| A.1 | Data forwarding method in this embodiment of this application | C.2 |
| A.6 | Data forwarding method in this embodiment of this application | B.1 |
| A.2 | Per-data unit table lookup, storage, and forwarding | — |
| ... | ... | ... |

In this embodiment of this application, the preconfigured mapping relationship between the at least one logical ingress port and the at least one logical egress port may be updated according to an effective time period of the logical ingress port and that of the logical egress port, that is, when a definition of a logical ingress port and that of a logical egress port in a system change, a corresponding device (such as a controller) in the system may update the mapping relationship.

It should be understood that, in this embodiment of this application, the logical port may be a unidirectional logical port or a bidirectional logical port. The first data unit sequence stream may be a unidirectional data unit sequence stream or a bidirectional data unit sequence stream. This embodiment of this application imposes no limitation on this.

Logical ports are obtained by combining timeslots obtained by performing timeslot division on a group (at least one group) of physical interfaces, and are related to a clock rate of the physical interface. Therefore, a rate of the logical port in the physical interface group is determined by a rate of a physical interface corresponding to the logical port. When a clock of the physical interface has a deviation, the logical port inherits the deviation.

An Ethernet asynchronous communication physical interface allows a clock frequency difference of plus or minus 100 ppm (1 ppm is one ten-thousandth), to decrease a requirement for a device. For example, in a 10GE network, for two physical interfaces with a 10G nominal bandwidth, one may have a bandwidth one ten-thousandth greater than the nominal value, and the other one may have a bandwidth one ten-thousandth less than the nominal value. The bandwidths are respectively 10Gx(1+0.0001) and 10Gx(1−0.0001).

An actual clock rate between logical ports inherits the clock frequency difference, plus or minus 100 ppm, of the physical interface. For example, a logical ingress port and a logical egress port each is a logical port obtained by cascading five 5G timeslots. Other than overheads for flexible Ethernet timeslot division and timeslot management, in an extreme case, actual bandwidths of two logical ports that are in different physical interface groups and that have a same nominal bandwidth are respectively 25Gx (20460/20461)× (1+0.0001) and 25Gx(20460/20461)×(1−0.0001). In this case, rate matching is required if data is forwarded by using the logical ingress port and the logical egress port.

It may be learned that, a rate of a logical ingress port may be unequal to a rate of a logical egress port corresponding to the logical ingress port. In other words, a transmission rate of a data unit sequence stream at the first logical ingress port may be unequal to a transmission rate of a data unit sequence stream at the first logical egress port. In this embodiment of this application, a quantity of idle units in the first data unit sequence stream is adjusted, so that a rate of an adjusted first data unit sequence stream matches a rate of the first logical egress port.

Specifically, a data unit sequence stream including both a data unit and an idle unit is used as an example for description. Distinguishing is performed on the first data unit sequence stream received through the first logical ingress port to distinguish a data unit and an idle unit, and the quantity of idle units is necessarily increased and decreased, so as to match a bandwidth difference of the logical egress port and match rates of the data unit sequence stream at the two logical ports.

Optionally, all idle units in the first data unit sequence stream may be deleted, and an appropriate quantity of idle units are reinserted at the first logical egress port according to a requirement. Certainly, in this embodiment of this application, an idle unit may be further inserted or deleted in real time according to a requirement. In this embodiment of this application, data is constantly forwarded in a form of a stream, and an idle unit is inserted or deleted along with the stream in real time. When a transmission rate of the first logical ingress port is not significantly different from a transmission rate of the first logical egress port, a quantity of idle units in the first data unit sequence stream at the first logical egress port may be equal to a quantity of idle units in the first data unit sequence stream at the first logical ingress port in a considerable period of time.

Optionally, in this embodiment of this application, splitting a continuous data unit is further allowed, so as to insert an idle unit. A simple method is to insert a new type of idle unit or an existing idle unit (such as an idle byte or an idle code element) at a splitting location, but a type of an idle unit inserted at the splitting location is different from a type of the idle unit in the first data unit sequence stream. In this way, a receive end may determine, according to the type of idle unit, that data behinds the idle unit is a continuation of a previous data unit, instead of a new data unit.

If the idle unit inserted at the splitting location is obvious, for example, in the Ethernet, idle units do not appear behind a location where a previous packet ends or before a location where a next packet starts may be the same. In addition, the receive end may further perform determining by determining a length of a data unit. For example, n fragments are currently received, and a total length of the n fragments is less than an allowed length of a normal data unit. When the receive end receives data, if a total length of the received data and the n fragments is still less than the allowed length of the normal data unit, the receive end may determine that the currently received data is still a fragment (that is, an $(n+1)^{th}$, fragment of a data unit). Once the currently received data is determined as the fragment, the data is a continuation of a previous data unit, instead of a new data unit. In this embodiment of this application, the fragment may be further identified in another manner, and this is not limited herein.

Figure 6:
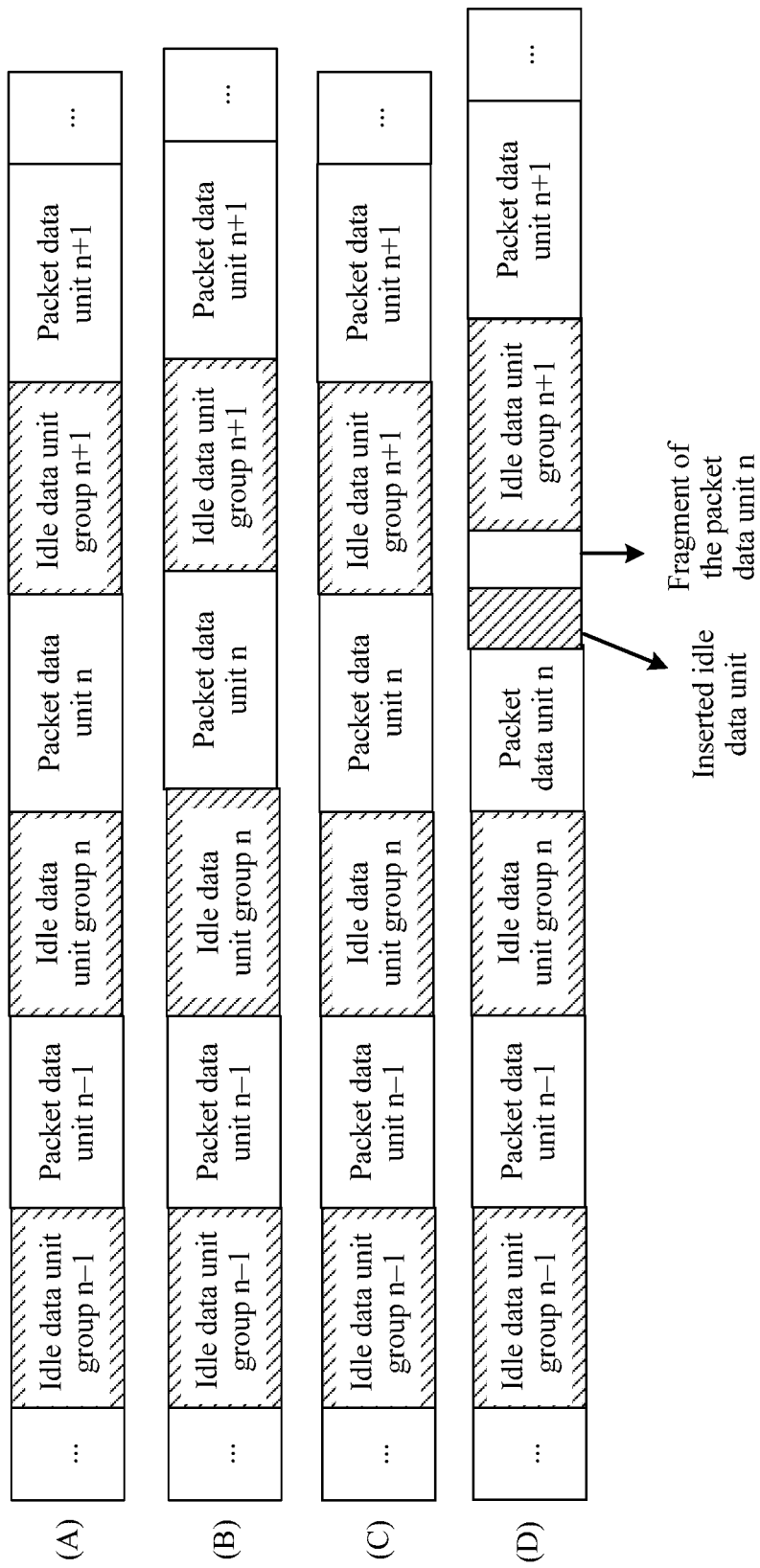
FIG. 6 is a schematic diagram of performing rate matching by adjusting a quantity of idle units according to an embodiment of this application.

FIG. 6 is a schematic diagram of performing rate matching by adjusting a quantity of idle units according to an embodiment of this application. In FIG. 6, for (A), that an Ethernet data unit sequence stream is received is used as an example, and the data unit sequence stream includes an idle unit group n−1, a packet data unit n−1, an idle unit group n, a packet data unit n, an idle unit group n+1, and a packet data unit n+1. Because a rate of a logical ingress port corresponding to the data unit sequence stream is less than a rate of a logical egress port corresponding to the data unit sequence stream, a quantity of idle units in the idle unit group n is increased when rate matching is performed in (B). In FIG. 6, (C) is a received data unit sequence stream, including an idle data unit group n−1, a packet data unit n−1, an idle unit group n, a packet data unit n, an idle unit group n+1, and a packet data unit n+1. Because a rate of a logical ingress port corresponding to the data unit sequence stream is less than a rate of a logical egress port corresponding to the data unit sequence stream and a rate difference is relatively large, when rate matching is performed in (D), the continuous packet data unit n is split to insert an idle unit.

For a length, approximately 1500 bytes, of the Ethernet packet data unit, even if a clock rate difference between the first logical ingress port and the first logical egress port is 200 ppm, to perform idle unit addition or deletion adjustment only between Ethernet packets (without splitting a packet data unit), cache depth needs only 1500×0.0002 bytes; and even for a 9.6k giant frame, cache depth needs less than 2 bytes. Compared with a data bit width of at least 4 bytes that is used by a 10GE and a 100GE, such a cache need may be ignored. Therefore, the packet data forwarding method in this embodiment of this application may be referred to as non-delay highly-efficient forwarding.

Figure 7A:
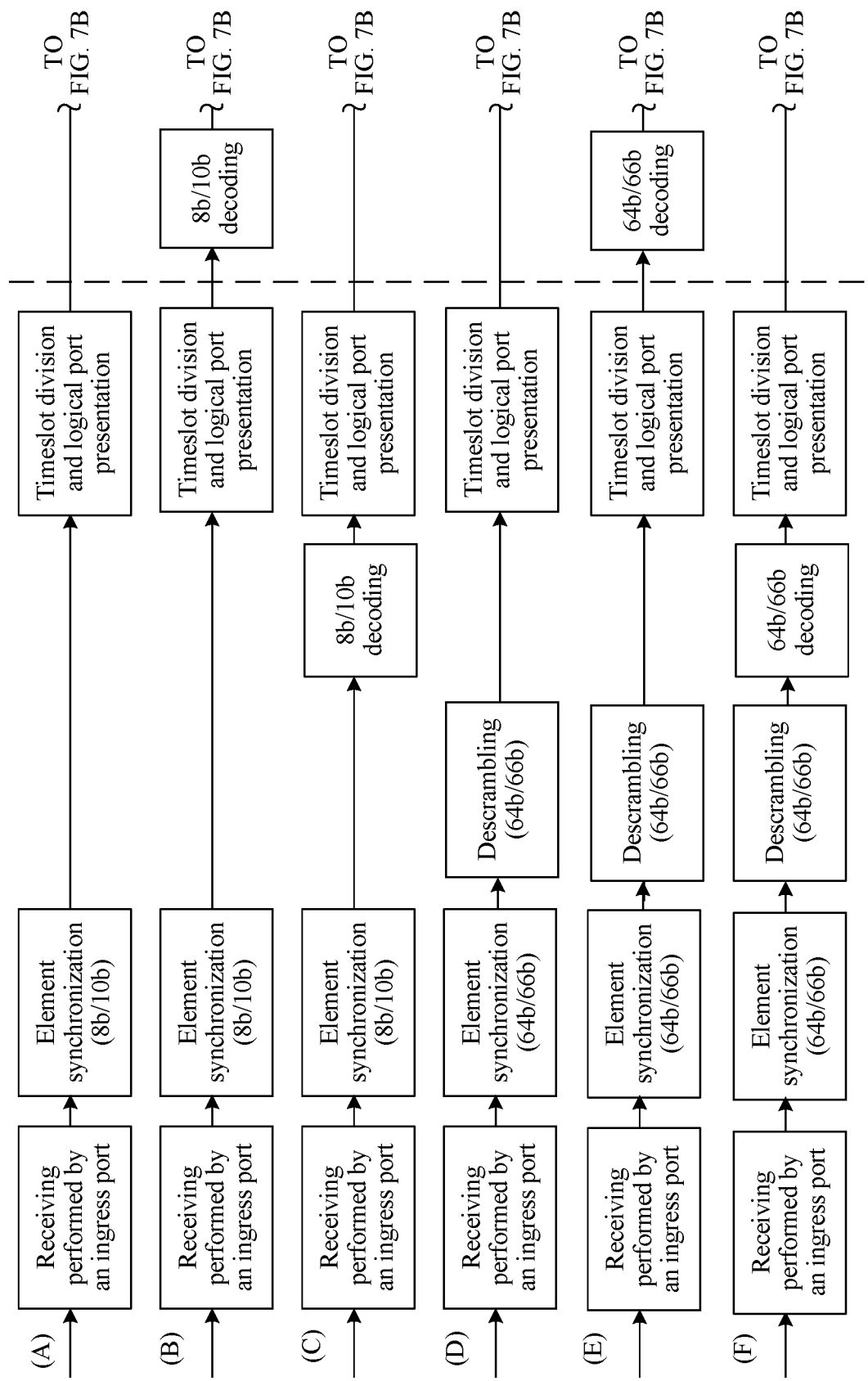
FIG. 7A and FIG. 7B are a schematic diagram of adjusting an idle unit according to embodiments of this application.
Figure 7B:
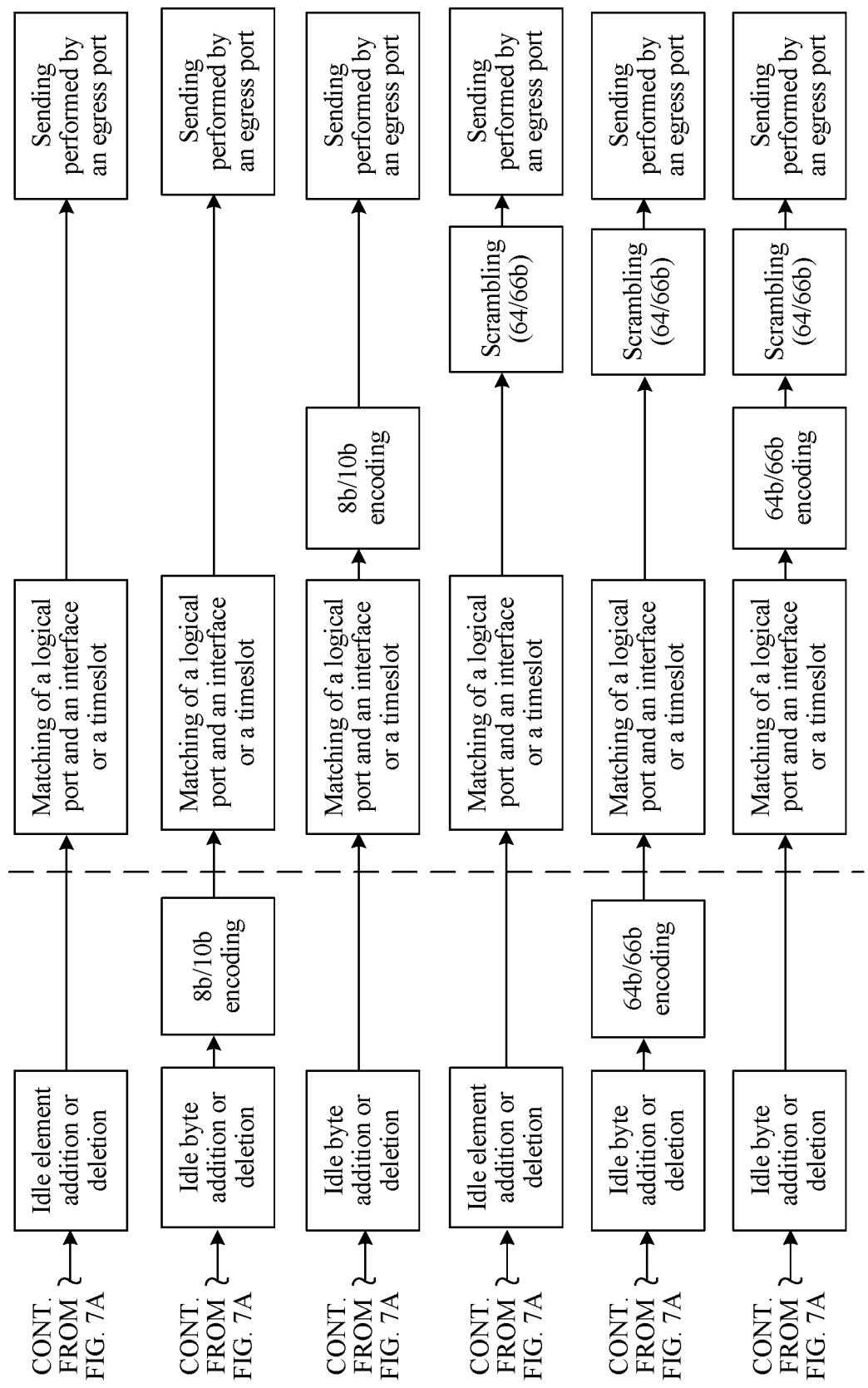

Optionally, in this embodiment of this application, addition and deletion of an idle unit may be controlled according to a bit width of a system. FIG. 7A and FIG. 7B are a schematic diagram of adjusting an idle unit according to embodiments of this application. (A) to (C) in FIG. 7A and FIG. 7B show an Ethernet system based on an 8B/10B code block. (D) to (F) in FIG. 7A and FIG. 7B show an Ethernet system based on a 64B/66B code block. In the two systems, area division is abstractly performed in terms of function. Functions corresponding to a first function area are a physical interface technology and timeslot division, and include steps of receiving data by an ingress port, performing descrambling (only corresponding to the 64B/66B code block system), performing timeslot division, and presenting a logical port. The functions corresponding to the first function area generally correspond to the foregoing described obtaining the first data unit sequence stream by using the first logical ingress port. A function corresponding to a second function area is rate matching, and mainly includes adjusting an idle unit (adding or deleting an idle byte or an idle code element). The function corresponding to the second function area generally corresponds to the foregoing described adjusting the quantity of idle units in the first data unit sequence stream, so that the rate of the adjusted first data unit sequence stream matches the rate of the first logical egress port. A function corresponding to a third function area is a logical port distinguishing technology, and includes steps of matching a logical port and an interface or a timeslot, performing scrambling (only corresponding to the 64B/66B code block system), and sending data by an egress port. The function corresponding to the third function area generally corresponds to the foregoing described sending the adjusted first data unit sequence stream by using the first logical egress port. Because the mapping relationship is generally built as a hardware configuration of the device, the example does not reflect a process in which the first logical egress port corresponding to the first logical ingress port is determined according to the preconfigured mapping relationship between a plurality of logical ingress ports and a plurality of logical egress ports.

An idle unit may be adjusted when a received original data unit sequence stream is not decoded and re-encoded. In this case, adjusting the idle unit is adding or deleting an idle code element, for example, (A) and (D) in FIG. 7A. Alternatively, an idle unit may be adjusted when a received data unit sequence stream is decoded and re-encoded. In this case, adjusting the idle unit is adding or deleting an idle byte, for example, (B), (C), (E), and (F) in FIG. 7B. Decoding and re-encoding in (B) and (E) in FIG. 7A and FIG. 7B are performed at a physical interface, and decoding and re-encoding in (C) and (F) in FIG. 7A and FIG. 7B are performed at a logical port.

Corresponding to FIG. 7A and FIG. 7B, when the first data unit sequence stream is an encoded data unit sequence stream, a manner of adjusting the quantity of idle units in the first data unit sequence stream may include the following steps: decoding the first data unit sequence stream; adjusting a quantity of idle bytes in a decoded first data unit sequence stream, so that a rate of an adjusted first data unit sequence stream matches the rate of the first logical egress port; and encoding the adjusted first data unit sequence stream; where the sending the adjusted first data unit sequence stream by using the first logical egress port includes: sending an adjusted and encoded first data unit sequence stream by using the first logical egress port. In another manner of adjusting the quantity of idle units in the first data unit sequence stream, the first data unit sequence stream is an encoded data unit sequence stream, and the adjusting a quantity of idle units in the first data unit sequence stream includes: adjusting a quantity of encoded idle code elements in the first data unit sequence stream, so that a rate of an adjusted first data unit sequence stream matches the rate of the first logical egress port.

Figure 8:
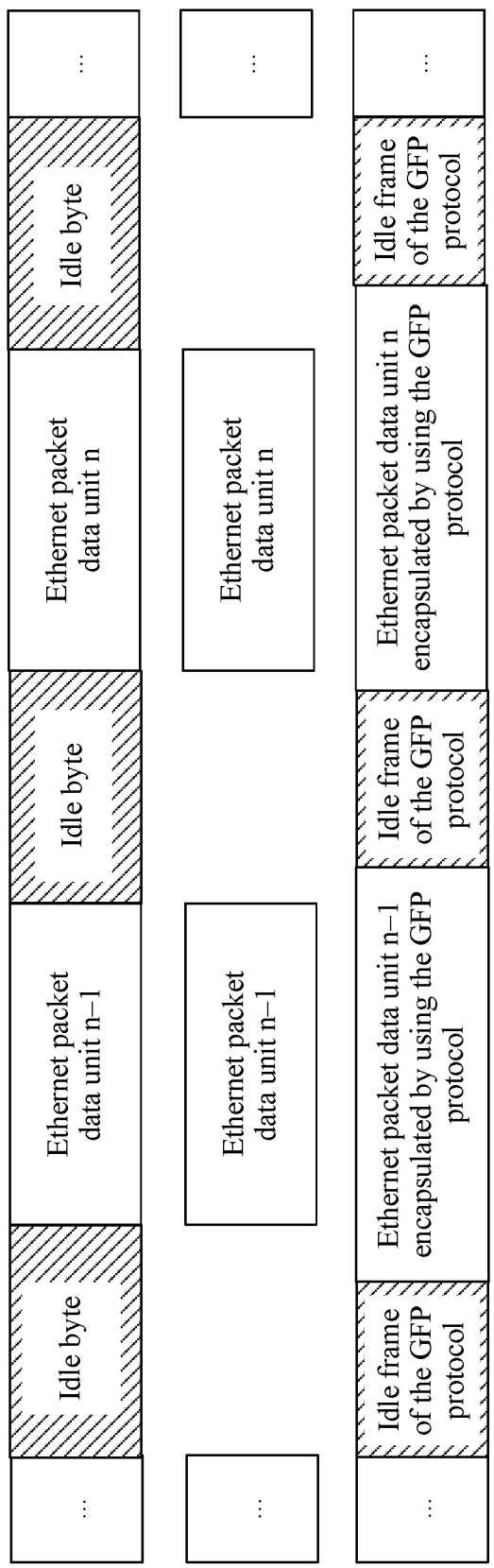
FIG. 8 is a schematic diagram of a rate matching manner according to an embodiment of this application.

FIG. 8 is a schematic diagram of a rate matching manner according to an embodiment of this application. When a data unit sequence stream received by a logical ingress port is a data unit sequence stream of an Ethernet protocol and a physical interface corresponding to a logical egress port is an OTN physical interface, rate matching between the data unit sequence stream and the logical egress port may be implemented by using a GFP protocol. The GFP protocol defines an idle frame, an effect of the idle frame is similar to that of an Ethernet idle byte, and therefore, all original idle units (for example, the original idle units may be idle bytes) in the data unit sequence stream of the Ethernet protocol may be first deleted, a packet data unit is encapsulated by using the GFP protocol, and an idle frame of the GFP protocol is inserted, to perform rate adaptation. In this case, in this embodiment of this application, a bandwidth allocated to a logical port should be sufficient to support a bandwidth of a data unit sequence stream obtained after the packet data unit is encapsulated by using the GFP protocol.

As mentioned above, an FC data unit and an InfiniBand data unit each is similar to an Ethernet packet data unit. An idle unit between FC data units and that between InfiniBand data units each is similar to an Ethernet idle unit. Therefore, a method for performing rate adaptation between an FC data unit sequence stream and a logical egress port and a method for performing rate adaptation between an InfiniBand data unit sequence stream and a logical egress port each is similar to the rate adaptation method for the Ethernet data unit sequence stream. Details are not described herein again.

A physical interface of a conventional SDH, a conventional OTN, and the like of a third-party protocol also has a capability of supporting timeslot division and a logical port, for example, a timeslot of the SDH, a timeslot in the conventional OTN, and a timeslot in a higher order optical channel payload unit (OPU) of the FlexOTN. Correspondingly, rate matching may be implemented by using a new Generic Framing Procedure (GFP), an idle insert/delete based mapping procedure (IMP) for an Ethernet service, or the like. Therefore, existing physical interface technologies such as the SDH, the OTN, and the FlexOTN, original investment, research and development investment, and resources such as a chip and an optical module, especially resources for long distance optical transmission may still be used.

An example in which rate matching is performed on a data unit sequence stream received by a CPRI interface is used for detailed description in the following. A basic frame of a CPRI interface protocol is in a unit of a byte and has a fixed frame length. 8B/10B encoding or 64B/66B encoding may be used for a typical CPRI physical interface. For an interface technology of another type of service such as a CBR service such as the SDH/the OTN, a manner similar to that for the CPRI may be used to perform 64B/66B encoding or the like on a data frame structure unit sequence corresponding to the interface technology. Therefore, in these protocols, a data frame is a data unit. An idle byte, an 8B/10B encoded idle code element, or a 64B/66B encoded idle code element may be inserted between frames (data units). These data unit sequence streams may be supported on a forwarding device based on an interface technology such as the Ethernet or the FlexE.

As mentioned above, the CPRI data unit is a CPRI super frame and is similar to the Ethernet packet data unit, and a corresponding method may be used to mark locations of a frame start, a continuation, and a frame end. Therefore, similar to the Ethernet data unit sequence stream, rate matching may also be performed by adjusting an idle unit in the CPRI data unit sequence stream. Herein, adjusting the idle unit in the CPRI data unit sequence stream is mainly adding an idle unit. That is, adjustment is implemented by adding the idle unit to a native CPRI data unit sequence stream that includes no idle unit and that is received through a native CPRI interface or port and adapting an obtained CPRI data unit sequence stream to a non-native interface or port, for example, a flexible Ethernet port.

Figure 9:
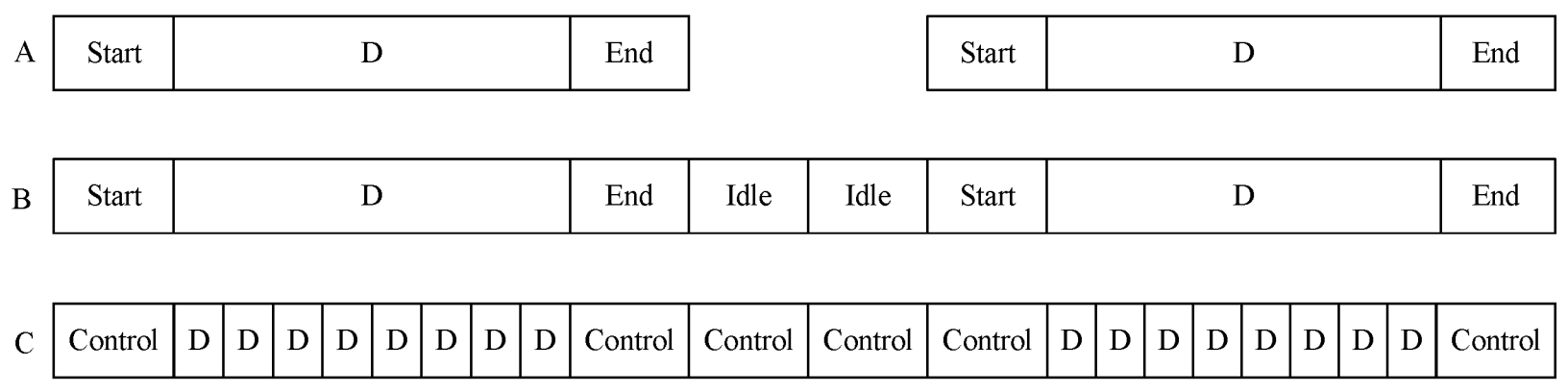

FIG. 9 shows a schematic diagram of performing rate matching on a CPRI data unit sequence stream. A in FIG. 9 shows two data units in the CPRI data unit sequence stream when rate matching is not performed. The data unit includes parts separately indicating a start and an end of the data unit, and a remaining part is a data part D. When a logical egress port is a port of an Ethernet protocol, an Ethernet idle code block is inserted into an encoded CPRI data unit (as shown in C in FIG. 9, after encoding is performed, the data part is encoded as a code element, and a start part, an end part, and an idle unit each is encoded as a control code element); or equivalently, an idle unit (as shown in B in FIG. 9) is first inserted into a data unit that is not encoded, and encoding is then performed. In either manner, a data unit sequence stream of a CPRI super frame may be converted into the Ethernet packet data unit sequence stream in the foregoing embodiment. In addition, switching of a CPRI service on a data forwarding device in this embodiment of this application is implemented in the method in this embodiment of this application. For example, for a CPRI line bit rate option 8: 10137.6 Mbit/s, 64B/66B line coding (20×491.52×66/64 Mbit/s), a rate obtained after encoding is performed is 10.1376G and is less than 10.3125G in a 10GE network or less than a total bandwidth of two timeslots of the FlexE. Therefore, an appropriate quantity of idle units may be inserted into the data unit sequence stream, so that the data unit sequence stream may be transmitted on a 10GE physical interface or a logical port corresponding to two 5G timeslots of the FlexE. An insertion location selected for the idle unit may be a location between an end code block and a start code block or may be a location inside the data. This embodiment of this application imposes no limitation on this.

In a specific example, a design similar to the following one may be made. For example, with reference to the following rate value, before encoding is performed, a rate in each option of the CPRI interface is n×491.528M. When n is equal to 10, the rate may match a 5G timeslot of the current FlexE, and remaining bandwidths are sufficient.

In the CPRI technology, rates in the option 8 and an option 10 that are obtained after encoding is performed are relatively close to bandwidths of a 2×5G timeslot and a 5×5G timeslot of the FlexE, and remaining bandwidths are sufficient; and the rates in the option 8 and the option 10 are close to an actual bandwidth of a 10GE Ethernet physical interface and an actual bandwidth of a 25GE Ethernet physical interface, and remaining bandwidths are sufficient. When a total bandwidth of the data unit sequence stream is less than or equal to a bandwidth of the logical port, even if there is a clock frequency difference of plus or minus 100 ppm (1 ppm is one ten-thousandth), between the physical interface and the logical port, rate matching may be implemented by appropriately adjusting the idle unit.

Similarly, when a rate of an OTN data unit sequence stream is matched with a logical egress interface of the Ethernet protocol, a first byte and a last byte of FAS overheads in an OTU-k frame of an OTN data unit may be respectively replaced with characters /T/ and /S/, and an idle byte is then inserted into the OTN data unit sequence stream (not encoded) or an idle code element is inserted into the OTN data unit sequence stream (encoded) to complete rate matching, so that the data unit sequence stream on which rate matching is performed can be sent through the logical egress interface of the Ethernet protocol.

It may be learned from the foregoing examples that, the adjusting a quantity of idle units in the first data unit sequence stream may include: when the first data unit sequence stream includes an idle unit, increasing or decreasing the quantity of idle units in the first data unit sequence stream; or when the first data unit sequence stream includes no idle unit, increasing the quantity of idle units in the first data unit sequence stream.

It should be understood that, in this embodiment of this application, a total bandwidth of the at least one first data unit in the first data unit sequence stream is less than or equal to a saturation bandwidth of the first logical ingress port and is less than or equal to a saturation bandwidth of the first logical egress port. By means of this configuration, it may be ensured that a service can separately match a rate of the logical ingress port and a rate of the logical egress port by adjusting an idle unit.

It should be further understood that, when data unit sequence streams of various types of protocols are forwarded in the method in this embodiment of this application, the forwarding device does not distinguish the data unit sequence streams from perspectives of a service and a protocol.

It should be further understood that, in this embodiment of this application, for a method for performing matching on rates of data unit sequence streams of various protocols, various existing solutions may be used, and the method is not limited to the foregoing described method.

In the data forwarding method in this embodiment of this application, the data unit sequence stream is forwarded by using a direct mapping relationship between logical ports, and rate matching between the data unit sequence stream and a downstream egress port is implemented by adjusting the quantity of idle units. Therefore, forwarding pressure of a forwarding device can be effectively reduced, a service throughput capability of the forwarding device can be effectively increased, and a data forwarding delay can be decreased, so that the method can be adapted to a delay-sensitive large-bandwidth service.

Figure 10:
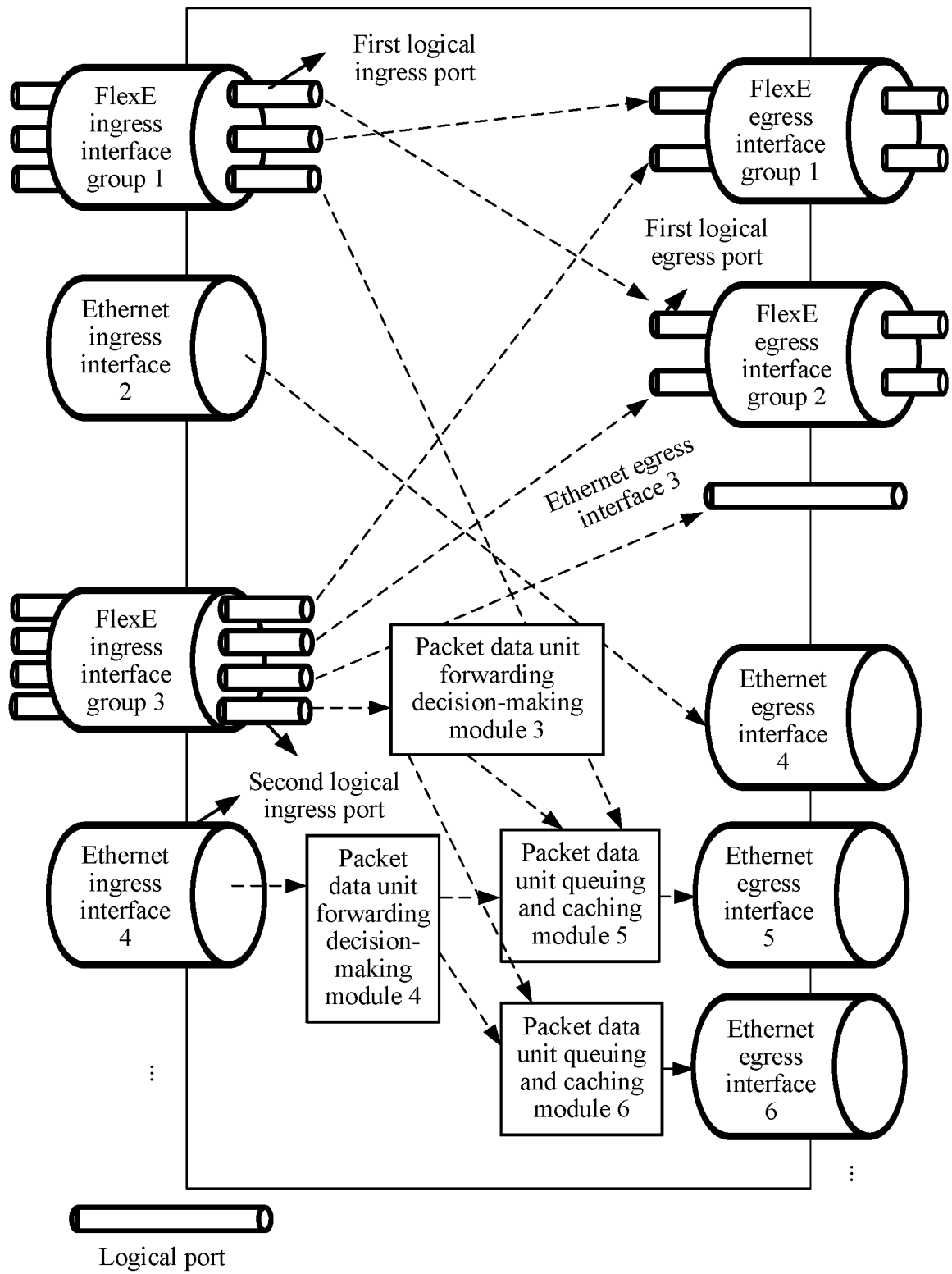
FIG. 10 is a schematic diagram of a data forwarding method according to another embodiment of this application.

FIG. 10 is a schematic diagram of a packet data forwarding method according to another embodiment of this application. As shown in FIG. 10, a forwarding device may further receive a second data unit sequence stream by using a second logical ingress interface (such as the interface A.2 mentioned above), and data switching is performed on the second data unit sequence stream by using the existing data forwarding method described in FIG. 2. For example, a plurality of packet data units in a second data unit sequence stream received by an Ethernet ingress interface 4 pass through a packet data unit forwarding decision-making module 4 corresponding to the Ethernet ingress interface 4, and respectively queue and are respectively cached in a packet data unit queuing and caching module 5 and a packet data unit queuing and caching module 6, and are sent through an Ethernet egress interface 5 and an Ethernet egress interface 6. For another example, a plurality of packet data units in a second data unit sequence stream received by a second logical ingress port in a FlexE ingress interface group 3 pass through a packet data unit forwarding decision-making module 3, and respectively queue and are respectively cached in a packet data unit queuing and caching module 5 and a packet data unit queuing and caching module 6, and are sent through an Ethernet egress interface 5 and an Ethernet egress interface 6.

This embodiment of this application further includes a solution in which no forwarding decision-making is performed on a plurality of packet data units in a data unit sequence stream, and the plurality of packet data units directly enter a corresponding packet data unit queuing and caching module for queuing and being cached. For example, a plurality of packet data units in a data unit sequence stream received by a last logical ingress port in a FlexE ingress interface group 1 are directly sent to the packet data unit queuing and caching module 5 for queuing and being cached without passing through the packet data unit forwarding decision-making module for decision making, and are sent through the Ethernet egress interface 5.

Correspondingly, the data forwarding method in this application may further include: obtaining a second data unit sequence stream by using a second logical ingress port, where the second data unit sequence stream includes at least one second data unit, and each second data unit in the at least one second data unit includes forwarding decision-making reference information; determining, according to the forwarding decision-making reference information, a second logical egress port corresponding to each second data unit in the at least one second data unit; caching each second data unit into a cache queue of the corresponding second logical egress port; and sending the second data unit in the second data unit sequence stream by using the second logical egress port.

The forwarding decision-making reference information may include a destination address, a forwarding label, or the like.

Figure 11:
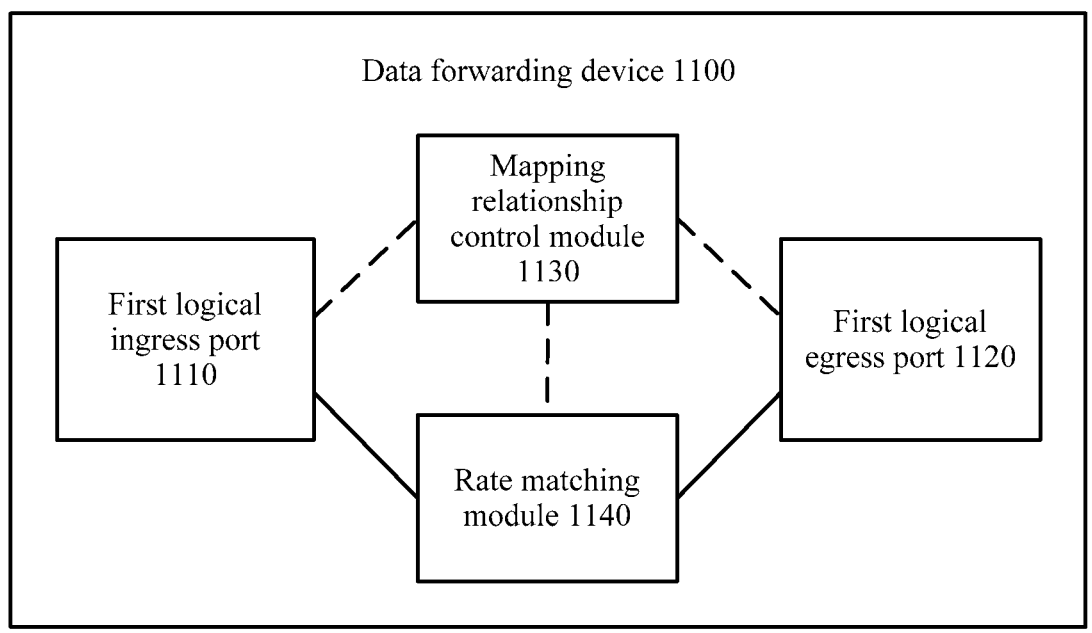
FIG. 11 is a schematic block diagram of a data forwarding device according to an embodiment of this application.

An embodiment of this application further provides a data forwarding device corresponding to the foregoing forwarding device. FIG. 11 is a schematic block diagram of a data forwarding device 1100 according to an embodiment of this application. As shown in FIG. 11, the device includes a first logical ingress port 1110, a first logical egress port 1120, a mapping relationship control module 1130, and a rate matching module 1140. The first logical ingress port 1110 is configured to obtain a first data unit sequence stream, where the first data unit sequence stream includes at least one first data unit. The mapping relationship control module 1130 is configured to determine the first logical egress port 1120 corresponding to the first logical ingress port 1110 according to a preconfigured mapping relationship between at least one logical ingress port and at least one logical egress port, where the at least one logical ingress port includes the first logical ingress port 1110. The rate matching module 1140 is configured to adjust a quantity of idle units in the first data unit sequence stream, so that a rate of an adjusted first data unit sequence stream matches a rate of the first logical egress port 1120. The first logical egress port 1120 is configured to send the adjusted first data unit sequence stream.

The mapping relationship includes a software configuration and a hardware configuration built into the device.

A software configuration mapping relationship may be a correspondence that is described by using the foregoing described configuration table and that is between a logical ingress port and a logical egress port. These mapping relationships are generally stored in a management system and may be stored and used in a network management computer system in a form of a table.

A hardware configuration mapping relationship may be a cross/switching connection relationship between cross/switching components that is built into a device, for example, a cross connection relationship between space division (S) cross components based on a crossbar, or a relationship of sequential writing and configured-sequence reading and a relationship of configured-sequence writing and sequential reading between time division (T) switching components based on timeslot storage, or a cross/switching connection relationship between level 3 cross components in combination forms of T-S-T and S-T-S. With development of communications technologies, a currently available mapping relationship may be a switching connection relationship of a switching network chip set (Fabric and Fabric Interface Chip, FAB&FIC) based on a cell, or a switching connection relationship of a monolithic switching network chip based on a shared memory, or the like, so as to implement highly-efficient non-table forwarding.

The rate matching module 1140 and a cross/switching function for building the mapping relationship into the device may be integrated together. For example, in a switched network component based on the shared memory, writing is performed at a rate of a first input logical port. When there is a relatively large amount of data to be written, idle data that is not written into the shared memory or idle data that is written into the shared memory is appropriately deleted, or all idle data is not written and only a data unit is written. Data is continuously read from the shared memory and sent by using the first logical egress port 1120. When data cached in a cache is insufficient for being output to the first logical egress port 1120, an idle unit is inserted into the data unit sequence stream to complete rate matching. This embodiment of this application imposes no limitation on a specific implementation form of the rate matching module 1140 and the mapping relationship.

Optionally, in an embodiment, the mapping relationship between the at least one logical ingress port and the at least one logical egress port includes at least one of the following mapping relationships: a one-to-one mapping relationship between a logical ingress port in the at least one logical ingress port and a logical egress port in the at least one logical egress port; a one-to-many mapping relationship between a logical ingress port in the at least one logical ingress port and a plurality of logical egress ports in the at least one logical egress port; or a many-to-one mapping relationship between a plurality of logical ingress ports in the at least one logical ingress port and a logical egress port in the at least one logical egress port.

Optionally, in an embodiment, a physical interface corresponding to each logical ingress port in the at least one logical ingress port and a physical interface corresponding to each logical egress port in the at least one logical egress port are the following types of interfaces: an optical transport network OTN interface, a flexible optical transport network FlexOTN interface, an Ethernet interface, a flexible Ethernet FlexE interface, a common public radio interface CPRI, a synchronous digital hierarchy SDH interface, a fiber channel FC interface, or an infinite bandwidth InfiniBand interface.

Optionally, in an embodiment, the at least one first data unit includes at least one of the following data units: an OTN data unit, a FlexOTN data unit, an Ethernet packet data unit, a FlexE packet data unit, a CPRI data unit, a synchronous digital hierarchy SDH data unit, an FC data unit, or an InfiniBand data unit.

Optionally, in an embodiment, a total bandwidth of the at least one first data unit in the first data unit sequence stream is less than or equal to a saturation bandwidth of the first logical ingress port and is less than or equal to a saturation bandwidth of the first logical egress port.

Optionally, in an embodiment, the first data unit sequence stream is an encoded data unit sequence stream. The rate matching module 1140 is specifically configured to: decode the first data unit sequence stream; adjust a quantity of idle bytes in a decoded first data unit sequence stream, so that a rate of an adjusted first data unit sequence stream matches the rate of the first logical egress port; and encode the adjusted first data unit sequence stream. The first logical egress port 1120 is specifically configured to send an adjusted and encoded first data unit sequence stream.

Optionally, in an embodiment, the first data unit sequence stream is an encoded data unit sequence stream. The rate matching module 1140 is specifically configured to: adjust a quantity of encoded idle code elements in the first data unit sequence stream, so that a rate of an adjusted first data unit sequence stream matches the rate of the first logical egress port.

Optionally, in an embodiment, the device further includes a second logical ingress port, a second logical egress port, a data unit forwarding decision-making module, and a data unit queuing and caching module. The second logical ingress port is configured to obtain a second data unit sequence stream, where the second data unit sequence stream includes at least one second data unit, and each second data unit in the at least one second data unit includes forwarding decision-making reference information. The data unit forwarding decision-making module is configured to determine, according to the forwarding decision-making reference information, a second logical egress port corresponding to each second data unit in the at least one second data unit sequence stream. The data unit queuing and caching module is configured to cache each second data unit into a cache queue of the corresponding second logical egress port. The second logical egress port is configured to send the second data unit in the second data unit sequence stream.

The forwarding decision-making reference information may include a destination address, a forwarding label, or the like.

Optionally, in an embodiment, the rate matching module 1140 is specifically configured to: when the first data unit sequence stream includes an idle unit, increase or decrease the quantity of idle units in the first data unit sequence stream; or when the first data unit sequence stream includes no idle unit, increase the quantity of idle units in the first data unit sequence stream.

Optionally, in an embodiment, the first data unit sequence stream further includes at least one idle unit.

It should be understood that first, second, and the like and various numerical symbols are for distinguishing only for ease of description, and are not used to limit a scope of the embodiments of this application.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data forwarding method, comprising:
    obtaining a first data unit sequence stream by using at least one timeslot of at least one physical ingress interface corresponding to a first logical ingress port, wherein the first data unit sequence stream comprises at least one first data unit, wherein the first data unit sequence stream comprises an idle unit, wherein the idle unit is a 64B/66B idle block;
    determining, according to a preconfigured mapping relationship between at least one logical ingress port and at least one logical egress port, a first logical egress port corresponding to the first logical ingress port, wherein the at least one logical ingress port comprises the first logical ingress port;
    increasing or decreasing a quantity of idle units in the first data unit sequence stream, so that a rate of an adjusted first data unit sequence stream matches a rate of the first logical egress port; and
    sending the adjusted first data unit sequence stream by using at least one timeslot of at least one physical egress interface corresponding to the first logical egress port.

2. The method according to claim 1, wherein the mapping relationship between the at least one logical ingress port and the at least one logical egress port comprises at least one of the following mapping relationships:
    a one-to-one mapping relationship between a logical ingress port in the at least one logical ingress port and a logical egress port in the at least one logical egress port;
    a one-to-many mapping relationship between a logical ingress port in the at least one logical ingress port and a plurality of logical egress ports in the at least one logical egress port; or
    a many-to-one mapping relationship between a plurality of logical ingress ports in the at least one logical ingress port and a logical egress port in the at least one logical egress port.

3. The method according to claim 1, wherein a physical interface corresponding to each logical ingress port in the at least one logical ingress port and a physical interface corresponding to each logical egress port in the at least one logical egress port are the following types of interfaces:
    an optical transport network (OTN) interface, a flexible optical transport network (FlexOTN) interface, an Ethernet interface, a flexible Ethernet (FlexE) interface, a common public radio interface (CPRI), a synchronous digital hierarchy (SDH) interface, a fiber channel (FC) interface, or an infinite bandwidth (InfiniBand) interface.

4. The method according to claim 1, wherein the at least one first data unit comprises at least one of the following data units:
    an OTN data unit, a FlexOTN data unit, an Ethernet packet data unit, a FlexE packet data unit, a CPRI data unit, a synchronous digital hierarchy SDH data unit, an FC data unit, or an InfiniBand data unit.

5. The method according to claim 1, wherein a total bandwidth of the at least one first data unit in the first data unit sequence stream is less than or equal to a saturation bandwidth of the first logical ingress port and is less than or equal to a saturation bandwidth of the first logical egress port.

6. The method according to claim 1, wherein the first data unit sequence stream is an encoded data unit sequence stream;
    wherein the increasing or decreasing the quantity of idle units in the first data unit sequence stream comprises:
    decoding the first data unit sequence stream;
    adjusting a quantity of idle bytes in a decoded first data unit sequence stream, so that a rate of an adjusted first data unit sequence stream matches the rate of the first logical egress port; and
    encoding the adjusted first data unit sequence stream; and
    wherein the sending the adjusted first data unit sequence stream by using the first logical egress port comprises:
    sending an adjusted and encoded first data unit sequence stream by using the first logical egress port.

7. The method according to claim 1, wherein the first data unit sequence stream is an encoded data unit sequence stream; and
    wherein the increasing or decreasing the quantity of idle units in the first data unit sequence stream comprises:
    adjusting a quantity of encoded idle code elements in the first data unit sequence stream, so that a rate of an adjusted first data unit sequence stream matches the rate of the first logical egress port.

8. The method according to claim 1, wherein the method further comprises:
    obtaining a second data unit sequence stream by using a second logical ingress port, wherein the second data unit sequence stream comprises at least one second data unit, and each second data unit in the at least one second data unit comprises forwarding decision-making reference information;
    determining, according to the forwarding decision-making reference information, a second logical egress port corresponding to each second data unit in the at least one second data unit;
    caching each second data unit into a cache queue of the corresponding second logical egress port; and
    sending the second data unit in the second data unit sequence stream by using the second logical egress port.

9. The method according to claim 1, wherein the increasing or decreasing the quantity of idle units in the first data unit sequence stream comprises:
    when the first data unit sequence stream comprises no idle unit, increasing the quantity of idle units in the first data unit sequence stream.

10. A data forwarding device, comprising a first logical ingress port, a first logical egress port, and a processor; wherein:
    the first logical ingress port is configured to obtain a first data unit sequence stream by using at least one timeslot of at least one physical ingress interface, wherein the first data unit sequence stream comprises at least one first data unit, wherein the first data unit sequence stream comprises an idle unit, wherein the idle unit is a 64B/66B idle block;
    the processor is configured to:
    determine, according to a preconfigured mapping relationship between at least one logical ingress port and at least one logical egress port, the first logical egress port corresponding to the first logical ingress port, wherein the at least one logical ingress port comprises the first logical ingress port; and
    increase or decrease a quantity of idle units in the first data unit sequence stream, so that a rate of an adjusted first data unit sequence stream matches a rate of the first logical egress port; and the first logical egress port is configured to send the adjusted first data unit sequence stream by using at least one timeslot of at least one physical egress interface.

11. The device according to claim 10, wherein the mapping relationship between the at least one logical ingress port and the at least one logical egress port comprises at least one of the following mapping relationships:
a one-to-one mapping relationship between a logical ingress port in the at least one logical ingress port and a logical egress port in the at least one logical egress port;
a one-to-many mapping relationship between a logical ingress port in the at least one logical ingress port and a plurality of logical egress ports in the at least one logical egress port; or
a many-to-one mapping relationship between a plurality of logical ingress ports in the at least one logical ingress port and a logical egress port in the at least one logical egress port.

12. The device according to claim 10, wherein a physical interface corresponding to each logical ingress port in the at least one logical ingress port and a physical interface corresponding to each logical egress port in the at least one logical egress port are the following types of interfaces:
an optical transport network (OTN) interface, a flexible optical transport network (FlexOTN) interface, an Ethernet interface, a flexible Ethernet (FlexE) interface, a common public radio interface (CPRI), a synchronous digital hierarchy (SDH) interface, a fiber channel (FC) interface, or an infinite bandwidth (InfiniBand) interface.

13. The device according to claim 10, wherein the at least one first data unit comprises at least one of the following data units:
an OTN data unit, a FlexOTN data unit, an Ethernet packet data unit, a FlexE packet data unit, a CPRI data unit, a synchronous digital hierarchy SDH data unit, an FC data unit, or an InfiniBand data unit.

14. The device according to claim 10, wherein a total bandwidth of the at least one first data unit in the first data unit sequence stream is less than or equal to a saturation bandwidth of the first logical ingress port and is less than or equal to a saturation bandwidth of the first logical egress port.

15. The device according to claim 10, wherein the first data unit sequence stream is an encoded data unit sequence stream;
wherein the processor is specifically configured to:
decode the first data unit sequence stream;
increase or decrease the quantity of idle bytes in a decoded first data unit sequence stream, so that a rate of an adjusted first data unit sequence stream matches the rate of the first logical egress port; and
encode the adjusted first data unit sequence stream; and
wherein the first logical egress port is further configured to:
send an adjusted and encoded first data unit sequence stream.

16. The device according to claim 10, wherein the first data unit sequence stream is an encoded data unit sequence stream; and
wherein the processor is specifically configured to:
increase or decrease the quantity of encoded idle code elements in the first data unit sequence stream, so that a rate of an adjusted first data unit sequence stream matches the rate of the first logical egress port.

17. The device according to claim 10, wherein the device further comprises a second logical ingress port and a second logical egress port; wherein:
the second logical ingress port is configured to obtain a second data unit sequence stream, wherein the second data unit sequence stream comprises at least one second data unit, and each second data unit in the at least one second data unit comprises forwarding decision-making reference information;
the processor is further configured to:
determine, according to the forwarding decision-making reference information, a second logical egress port corresponding to each second data unit in the at least one second data unit sequence stream;
cache each second data unit into a cache queue of the corresponding second logical egress port; and
the second logical egress port is configured to send the second data unit in the second data unit sequence stream.

18. The device according to claim 10, wherein the processor is further configured to:
when the first data unit sequence stream comprises no idle unit, increase the quantity of idle units in the first data unit sequence stream.

19. A non-transitory computer readable medium storing program code thereon for data forwarding, the program code comprising instructions for executing a method that comprises:
obtaining a first data unit sequence stream by using at least one timeslot of at least one physical ingress interface corresponding to a first logical ingress port, wherein the first data unit sequence stream comprises at least one first data unit, wherein the first data unit sequence stream comprises an idle unit, wherein the idle unit is a 64B/66B idle block;
determining, according to a preconfigured mapping relationship between at least one logical ingress port and at least one logical egress port, a first logical egress port corresponding to the first logical ingress port, wherein the at least one logical ingress port comprises the first logical ingress port;
increasing or decreasing a quantity of idle units in the first data unit sequence stream, so that a rate of an adjusted first data unit sequence stream matches a rate of the first logical egress port; and
sending the adjusted first data unit sequence stream by using at least one timeslot of at least one physical egress interface corresponding to the first logical egress port.

* * * * *